United States Patent
Donderici

(10) Patent No.: US 12,479,443 B2
(45) Date of Patent: Nov. 25, 2025

(54) SYSTEM AND METHOD TO HELP SUPPLEMENT A VEHICLES SENSOR DATA

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 682 days.

(21) Appl. No.: 17/846,695

(22) Filed: Jun. 22, 2022

(65) Prior Publication Data
US 2023/0415751 A1  Dec. 28, 2023

(51) Int. Cl.
*B60W 40/08* (2012.01)
*G06V 20/59* (2022.01)

(52) U.S. Cl.
CPC ........... *B60W 40/08* (2013.01); *G06V 20/593* (2022.01); *B60W 2420/408* (2024.01); *B60W 2540/227* (2020.02)

(58) Field of Classification Search
CPC ........... B60W 40/08; B60W 2420/408; B60W 2540/227; G06V 20/593; G06V 40/172
See application file for complete search history.

(56) References Cited

U.S. PATENT DOCUMENTS

| | | | | |
|---|---|---|---|---|
| 11,663,474 B1* | 5/2023 | Cosic | | G06N 3/08 382/155 |
| 2016/0105539 A1* | 4/2016 | Maddox | | H04W 4/48 455/557 |
| 2021/0049901 A1* | 2/2021 | Young | | H04W 4/46 |
| 2022/0050471 A1* | 2/2022 | Gist, IV | | G05D 1/245 |
| 2022/0357181 A1* | 11/2022 | Vitale | | H04W 4/024 |
| 2022/0405317 A1* | 12/2022 | Marks | | G06V 20/20 |
| 2023/0092861 A1* | 3/2023 | Qi | | B60W 30/095 701/1 |
| 2023/0237908 A1* | 7/2023 | Hu | | G08G 1/096716 701/25 |

FOREIGN PATENT DOCUMENTS

WO    WO-2013159282 A1 * 10/2013  ......... G06K 9/00496

OTHER PUBLICATIONS

Machine Translation: WO-2013159282-A1 (Year: 2013).*

* cited by examiner

*Primary Examiner* — Anne Marie Antonucci
*Assistant Examiner* — Connor L Knight
(74) *Attorney, Agent, or Firm* — CANTOR COLBURN LLP

(57) ABSTRACT

One or more embodiments can include identifying a personal sensor on a user device, communicating a library of object recognition profiles for the personal sensor to the user device, capturing personal sensor data related to an environment, using the library of object recognition profiles for the personal sensor to use the captured personal sensor data to identify objects and/or features in the environment, and using the identified objects and/or features in the environment to supplement data collected by the autonomous vehicle's sensors. The library of object recognition profiles can be created by identifying the personal sensor on the user device, training a personal perception module to identify objects and/or other features in an environment setting based on data captured by the personal sensor, and using the training from the personal perception module to create the library of object recognition profiles for the personal sensor.

19 Claims, 19 Drawing Sheets

SYSTEM AND METHOD TO HELP SUPPLEMENT A VEHICLES SENSOR DATA

TECHNICAL FIELD OF THE DISCLOSURE

The present disclosure relates generally to a vehicle and, more specifically, to devices and methods for supplementing a vehicle's sensor data.

BACKGROUND

An autonomous vehicle (AV) is a vehicle that is capable of sensing and navigating its environment with little or no user input. The AV may sense its environment using sensing devices such as radio detection and ranging (RADAR), light detection and ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying FIGURES, wherein like reference numerals represent like parts, in which.

Figure 1:
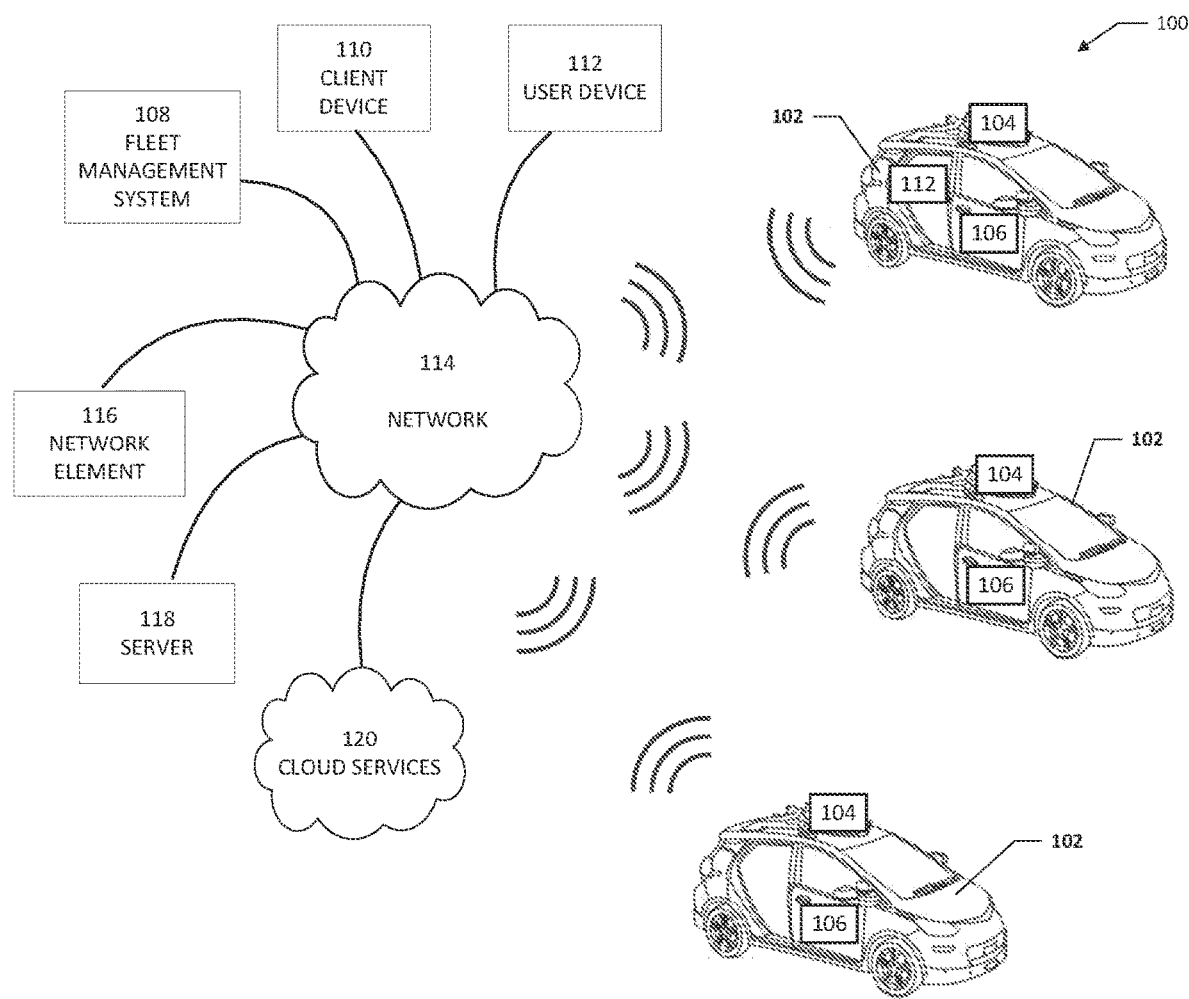
FIG. 1 shows an autonomous vehicle environment according to some embodiments of the present disclosure.

The FIGURES of the drawings are not necessarily drawn to scale, as their dimensions can be varied considerably without departing from the scope of the present disclosure.

DESCRIPTION OF EXAMPLE EMBODIMENTS OF THE DISCLOSURE

Overview

The demand for autonomous vehicle (AV) ridehail and rideshare has been rising. However, many services cannot meet the rising demand due to high cost and technical challenges. For example, an AV can be relatively expensive and requires a complex system of sensors to allow the AV to safely navigate in the environment. Therefore, improved technology for autonomous vehicles is needed.

A system and method to supplement an AV's sensors can help to overcome these problems. More specifically, the system can allow the AV to use the resources of a user device to supplement the AV's sensors. For example, supplementary sensor data from the user device can be combined with sensor data from the onboard sensors of the AV to supplement the AV's sensors.

In a specific example, a supplementary sensor can be trained to identify objects and/or features in the environment around the user device. After the training, a set of calibration profiles can be created for the supplementary sensor. The calibration profiles can be an executable set of machine instructions to be used on data collected by the supplementary sensor. In an example, the executable set of machine instructions are stored as binary code to allow the executable set of machine instructions to be executed on different devices. When supplementary sensor data is needed by an AV, the AV can determine what type of supplementary sensors are available, determine the calibration profile for each available supplementary sensor, and execute the calibration profile to analyze the supplementary data from the supplementary sensor using a perception module to create a supplementary perception of an environment. The supplementary perception of the environment can be combined with the perception of the environment from the sensor of the AV. By supplementing the perception of the environment from the sensor of the AV with the supplementary perception of the environment from the supplementary sensor, a more complete perception of the environment can be obtained. The more complete perception of the environment can help the AV safely navigate the environment and the safety of users is better protected.

Embodiments of the present disclosure provide a method for supplementing an autonomous vehicle's sensors with a personal sensor on a user device. The method includes identifying the personal sensor on the user device, communicating a library of object recognition profiles for the personal sensor to the user device, capturing personal sensor data related to an environment, using the library of object recognition profiles for the personal sensor to use the captured personal sensor data to identify objects and/or features in the environment, and using the identified objects and/or features in the environment to supplement data collected by the autonomous vehicle's sensors. The method can also include identifying the personal sensor on the user device, training a personal perception module to identify objects and/or other features in an environment setting based on data captured by the personal sensor, and using the training from the personal perception module to create the library of object recognition profiles for the personal sensor. In some examples, the library of calibration profiles are an executable set of machine instructions and the executable set of machine instructions are in binary code. The library of object recognition profiles for the personal sensor can be stored in a network element and communicated to the autonomous vehicle after the user device that includes the personal sensor is identified. Also, the library of object recognition profiles for the personal sensor are stored in the autonomous vehicle. In addition, the library of object recognition profiles for the personal sensor may be stored in the personal device. In some examples, the identified objects and/or features in the environment were not detected by the sensors on the autonomous vehicle. The personal sensor can be a camera, a LIDAR sensor, and/or a sensor that is not on the autonomous vehicle. To help protect the privacy of user of the user device, the user of the user device can be requested for permission to use the personal sensor on the user device before the personal sensor is used to acquire data. In some examples, the user of the user device is requested to insert the user device in a user device holder in the autonomous vehicle to allow the personal sensor on the user device to acquire data. The user device can be a cellular phone, a smartphone, tablet, laptop, handheld device, or some other user device the user had brought into the AV. In some examples, the computation using the personal perception module can be performed on the personal device using object recognition profiles stored on the personal device.

In some examples, a vehicle for supplementing vehicle sensor data with supplemental sensor data from one or more sensors on the user device can include a sensor suite including external vehicle sensors to sense an environment and generate sensor data, a perception system to receive the sensor data and to acquire map data and to use the map data and the sensor data to generate vehicle real world environment data, and a user device interface module to communicate with the user device, and a user device resource usage module to use supplemental sensor data from one or more sensors on the user device to supplement the sensor data. The user device interface module can communicate a library of object recognition profiles for each of the one or more sensors on the user device where the user device uses the library of object recognition profiles to generate real world supplemental environment data. The real-world supplemental environment data can include data related to objects and/or features that are not included in the vehicle real world environment data. In some examples, the vehicle communicates a message to a user of the user device to position the user device in a specific area. In an example, a user device cradle to fix a position of the one or more sensors on the user device in a specific location and the user device cradle can charge the user device when the user device is coupled to the user device cradle.

In some examples, the system can determine that sensor data from an autonomous vehicle's sensors needs to be supplemented with supplementary sensor data, identify a user device that includes a supplementary sensor that can collect the supplementary sensor data, communicate a library of object recognition profiles for the supplementary sensor to the user device, capture the supplementary sensor data, use the library of object recognition profiles for the supplementary sensor to execute the captured supplementary sensor data to identify objects and/or features, and use the identified objects and/or features in the environment to supplement the sensor data collected by the autonomous vehicle's sensors. The library of object recognition profiles for the supplementary sensor can be created by identifying the supplementary sensor on the user device, training a personal perception module to identify objects and/or other features in an environment setting based on data captured by the supplementary sensor, and using the training from the personal perception module to create the library of object recognition profiles for the supplementary sensor. The library of calibration profiles can be an executable set of machine instructions. The library of object recognition profiles for the personal sensor can be stored in a network element and communicated to the autonomous vehicle after the user device that includes the supplementary sensor is identified. The library of object recognition profiles for the personal sensor can also be stored in the autonomous vehicle. In an example, the identified objects and/or features in the environment were not detected by the sensors on the autonomous vehicle. In some examples, the sensor is a camera or LIDAR sensor and the supplementary sensor data is collected through a passenger window of the autonomous vehicle. In an example, the system can request a user of the user device to position the user device in a certain position to allow the supplementary sensor on the user device to acquire data. In another example, the user of the user device is requested to inset the user device in a user device holder in the autonomous vehicle to allow the supplementary sensor on the user device to acquire data. To help protect the privacy of the user, the user of the user device is requested for permission to use the supplementary sensor on the user device before the supplementary sensor is used to acquire data.

In some examples, the system can include a user device that includes a supplementary sensor that can collect supplementary sensor data. The user device can use an object recognition profile from a user device library of object recognition profiles stored on the user device to analyze the captured supplementary sensor data and identify objects and/or features in the environment captured by the supplementary sensor. The identified objects and/or features can be used to supplement the sensor data collected by the autonomous vehicle's sensors. The user device library of object recognition profiles for the supplementary sensor can be created by identifying the supplementary sensor on the user device, training a personal perception module to identify objects and/or other features in an environment setting based on data captured by the supplementary sensor, and using the training from the personal perception module to create the user device library of object recognition profiles for the supplementary sensor. In some examples, the user device library of object recognition profiles can be an executable set of machine instructions. In addition, the user device library of object recognition profiles for the supplementary sensor can be stored in a network element and communicated to the autonomous vehicle after the user device that includes the supplementary sensor is identified by the autonomous vehicle. The user device library of object recognition profiles for the supplementary sensor can also be stored in the autonomous vehicle. In an example, the identified objects and/or features in the environment were not detected by the sensors on the autonomous vehicle. In some examples, the sensor is a camera or LIDAR sensor and the supplementary sensor data is collected through a passenger window of the autonomous vehicle. In an example, the system can request a user of the user device to position the user device in a certain position to allow the supplementary sensor on the user device to acquire data. In another example, the user of the user device is requested to inset the user device in a user device holder in the autonomous vehicle to allow the supplementary sensor on the user device to acquire data. To help protect the privacy of the user, the user of the user device is requested for permission to use the supplementary sensor on the user device before the supplementary sensor is used to acquire data As will be appreciated by one skilled in the art, aspects of the present disclosure, in particular aspects of supplementing a vehicle's sensor data, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as an "engine," a "circuit," a "module," or a "system." Functions described in this disclosure may be implemented as an algorithm executed by one or more hardware processing units (e.g., one or more microprocessors) of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied (e.g., stored) thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings. Other features and advantages of the disclosure will be apparent from the following description and the claims.

As described herein, one aspect of the present technology may be the gathering and use of data available from various sources to improve quality and experience. The present disclosure contemplates that in some examples, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art. In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings. As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

It is to be understood that other embodiments may be utilized and structural changes may be made without departing from the scope of the present disclosure. Substantial flexibility is provided by an electronic device in that any suitable arrangements and configure ration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Example Autonomous Vehicle System

FIG. 1 shows an AV environment 100 according to some embodiments of the present disclosure. The AV environment 100 can include AVs 102, a fleet management system 108, a client device 110, and a user device 112. Each of the AVs 102 can include an onboard controller 104 and a sensor suite 106. The onboard controller 104 controls the AV 102 and helps facilitate communication with the AV 102. The onboard controller 104 is described in more detail in FIG. 3 and below. The sensor suite 106 detects the environment inside and outside of the AV 102 and generates sensor data describing the surround environment. Certain sensors of the sensor suite 106 are described further in relation to FIG. 4 and below.

Each of the AVs 102, the fleet management system 108, the client device 110, and/or the user device 112 can be in communication using network 114. In addition, each of the AVs 102, the fleet management system 108, the client device 110, and/or the user device 112 can be in communication with one or more network elements 116, one or more servers 118, and cloud services 120 using the network 114. In other embodiments, the AV environment 100 may include fewer, more, or different components. For example, the AV environment 100 may include a different number of AVs 102 with some AVs 102 including the onboard controller 104 and some AVs 102 not including the onboard controller 104 (not shown). A single AV is referred to herein as AV 102, and multiple AVs are referred to collectively as AVs 102. For purpose of simplicity and illustration, FIG. 1 shows one client device 110 and one user device 112 in the AV 102. In other embodiments, the AV environment 100 includes multiple third-party devices or multiple client devices.

In some embodiments, the AV environment 100 includes one or more communication networks (e.g., network 114) that supports communications between some or all of the components in the AV environment 100. The network 114 may comprise any combination of local area and/or wide area networks, using both wired and/or wireless communication systems. In one embodiment, the network uses standard communications technologies and/or protocols. For example, the network 114 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 114 may be represented using any suitable format, such as hypertext markup language (HTML) or extensible markup language (XML). In some embodiments, all or some of the communication links of the network 114 may be encrypted using any suitable technique or techniques.

The AV 102 is a vehicle that is capable of sensing and navigating its environment with little or no user input. The AV 102 may be a semi-autonomous or fully autonomous vehicle (e.g., a boat, an unmanned aerial vehicle, a driverless car, etc.). Additionally, or alternatively, the AV 102 may be a vehicle that switches between a semi-autonomous state and a fully autonomous state and thus, the AV may have attributes of both a semi-autonomous vehicle and a fully autonomous vehicle depending on the state of the vehicle. The AV 102 may include a throttle interface that controls an engine throttle, motor speed (e.g., rotational speed of electric motor), or any other movement-enabling mechanism, a brake interface that controls brakes of the AV (or any other movement-retarding mechanism), and a steering interface that controls steering of the AV (e.g., by changing the angle of wheels of the AV). The AV 102 may additionally or alternatively include interfaces for control of any other vehicle functions (e.g., windshield wipers, headlights, turn indicators, air conditioning, etc.

Figure 3:
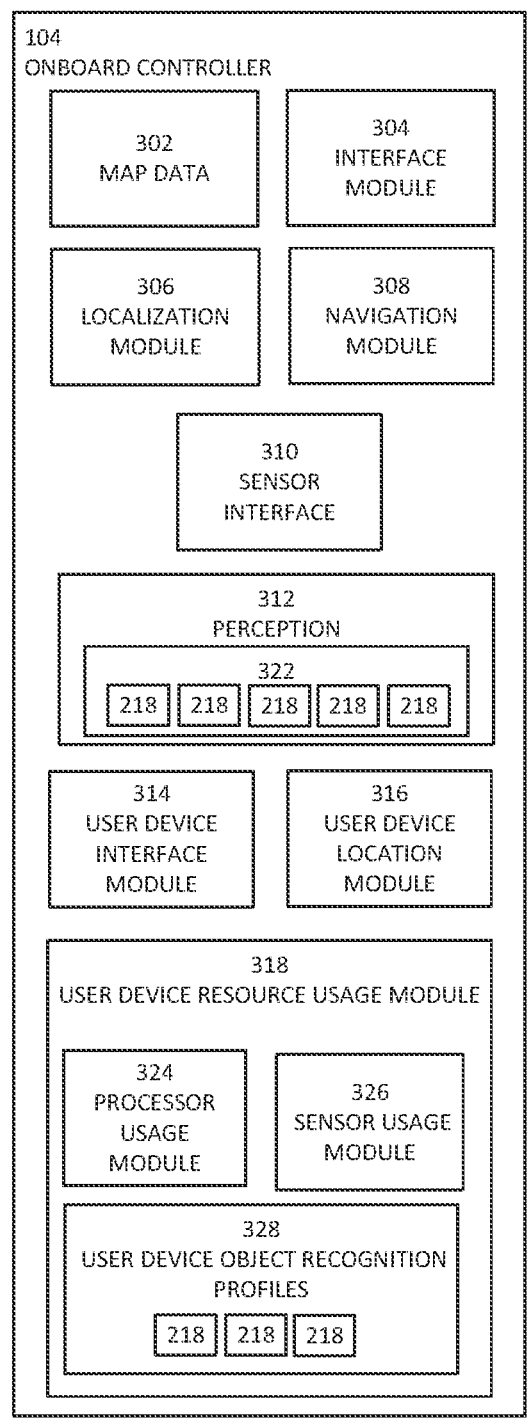
FIG. 3 is a block diagram illustrating an onboard controller of an AV according to some embodiments of the present disclosure.
Figure 4:
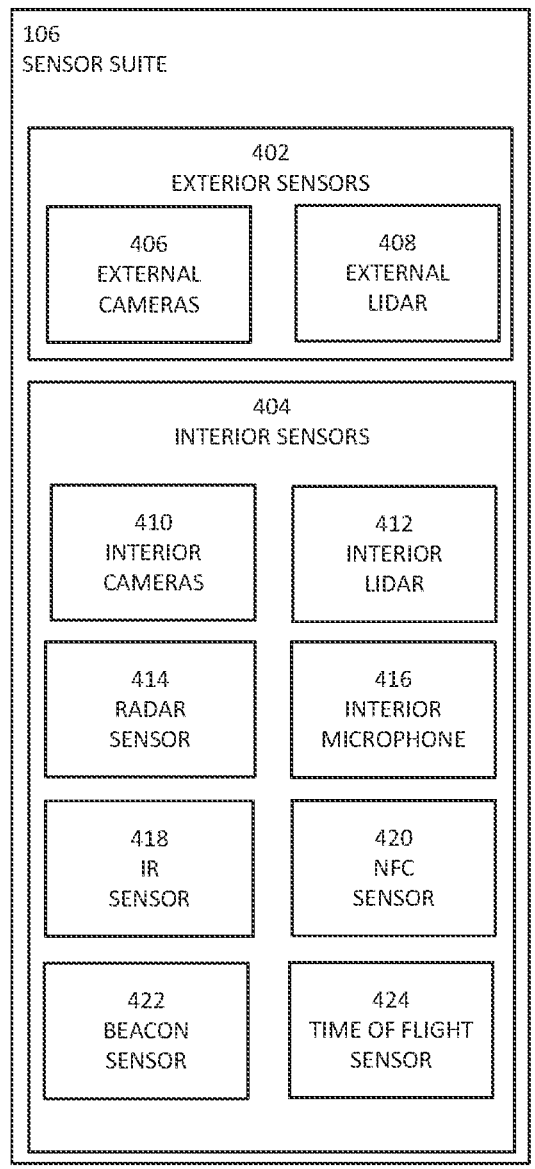
FIG. 4 illustrates a sensor suite according to some embodiments of the present disclosure.

In some embodiments, an AV 102 includes onboard controller 104 (shown in FIG. 3) and the onboard sensor suite 106 (shown in FIG. 4). The sensor suite 106 can include a computer vision ("CV") system, localization sensors, and driving sensors. For example, the sensor suite 106 may include interior and exterior cameras, radar sensors, sonar sensors, light detection and ranging (LIDAR) sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 102. For example, the AV 102 may have multiple cameras located at different positions around the exterior and/or interior of the AV 102.

The onboard controller controls operations and functionality of the AV 102. In some embodiments where the AV 102 includes the onboard controller 104, the onboard controller may control some operations and functionality of the onboard controller 104. In other embodiments where the AV 102 includes the onboard controller 104, the operations and functionality of the onboard controller 104 is separate from the onboard controller 104. In some embodiments, the onboard controller 104 is a general-purpose computer, but may additionally or alternatively be any suitable computing device. The onboard controller 104 is adapted for input/output (I/O) communication with other components of the AV 102 (e.g., the onboard sensor suite 106, an UI module of the AV, etc.) and external systems (e.g., the fleet management system 108). The onboard controller 104 may be connected to the Internet via a wireless connection (e.g., via a cellular data connection). Additionally, or alternatively, the onboard controller 104 may be coupled to any number of wireless or wired communication systems.

The onboard controller 104 processes sensor data generated by the onboard sensor suite 106 and/or other data (e.g., data received from the fleet management system 108) to determine the state of the AV 102. Based upon the vehicle state and programmed instructions, the onboard controller 104 modifies or controls behavior of the AV 102. In some embodiments, the onboard controller 104 implements an autonomous driving system (ADS) for controlling the AV 102 and processing sensor data from the onboard sensor suite 106 and/or other sensors in order to determine the state of the AV 102. Based upon the vehicle state and programmed instructions, the onboard controller 104 modifies or controls driving behavior of the AV 102.

An AV 102 may also include a rechargeable battery that powers the AV 102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 102 is a hybrid electric vehicle that also includes an internal combustion engine for powering the AV 102 (e.g., when the battery has low charge). In some embodiments, the AV 102 includes multiple batteries. For example, the AV 102 can include a first battery used to power vehicle propulsion, and a second battery used to power the onboard controller 104 and/or AV hardware (e.g., the onboard sensor suite 106 and the onboard controller 104). The AV 102 may further include components for charging the battery (e.g., a charge port configured to make an electrical connection between the battery and a charging station).

The fleet management system 108 manages ridehail/rideshare services using the AVs 102. Generally, a ridehail/rideshare service is a service where users are picked up and dropped off in a vehicle (AV 102). The ridehail/rideshare service is typically arranged using a website or app. The The fleet management system 108 may select an AV 102 from a fleet of AVs 102 to perform a particular ridehail, rideshare, and/or other tasks and instruct the selected AV 102 to autonomously drive to a particular location (e.g., an address to pick up a user). The fleet management system 108 sends a ridehail/rideshare request to the AV 102. The ridehail/rideshare request includes information associate with the ridehail/rideshare service, information of a user requesting the ridehail/rideshare (e.g., location, identifying information, etc.), information of a user to be picked up, etc. In some embodiments, the fleet management system 108 may instruct one single AV 102 to perform multiple ridehail/rideshare services. For example, the fleet management system 108 instructs the AV 102 to pick up riders and/or items from one location and deliver the riders and/or items to multiple locations, or vice versa. The fleet management system 108 also manages maintenance tasks, such as charging and servicing of the AVs 102. As shown in FIG. 1, each of the AVs 102 communicates with the fleet management system 108. The AVs 102 and fleet management system 108 may connect over a public network, such as the Internet. The fleet management system 108 is described further in relation to FIG. 2.

In some embodiments, the fleet management system 108 may also provide the AV 102 (and particularly, onboard controller 104) with system backend functions. The fleet management system 108 may include one or more switches, servers, databases, live advisors, or an automated voice response system (VRS). The fleet management system 108 may include any or all of the aforementioned components, which may be coupled to one another via a wired or wireless local area network (LAN). The fleet management system 108 may receive and transmit data via one or more appropriate devices and network from and to the AV 102, such as by wireless systems, such as 882.11x, general packet radio service (GPRS), and the like. A database at the fleet management system 108 can store account information such as subscriber authentication information, vehicle identifiers, profile records, behavioral patterns, and other pertinent subscriber information. The fleet management system 108 may also include a database of roads, routes, locations, etc. permitted for use by AV 102. The fleet management system 108 may communicate with the AV 102 to provide route guidance in response to a request received from the vehicle.

For example, based upon information stored in a mapping system of the fleet management system 108, the fleet management system 108 may determine the conditions of various roads or portions thereof. Autonomous vehicles, such as the AV 102, may, in the course of determining a navigation route, receive instructions from the fleet management system 108 regarding which roads or portions thereof, if any, are appropriate for use under certain circumstances, as described herein. Such instructions may be based in part on information received from the AV 102 or other autonomous vehicles regarding road conditions. Accordingly, the fleet management system 108 may receive information regarding the roads/routes generally in real-time from one or more vehicles.

The fleet management system 108 communicates with the client device 110. For example, the fleet management system 108 receives ridehail/rideshare requests from the client device 110. The ridehail/rideshare request may include information of the user to be picked up, information of one or more items to be picked up, information of the location for the pick up (e.g., store location, distribution center location, warehouse location, location of a customer, etc.), and so on. The fleet management system 108 can provide information associated with the ridehail/rideshare request (e.g., information related to the identity of the user to be picked up, information of the status of the ridehail/rideshare process, etc.) to the client device 110.

The client device 110 may be a device (e.g., a computer system) of a user of the fleet management system 108. The user may be an entity or an individual. In some embodiments, a user may be a customer of another user. In an embodiment, the client device 110 is an online system maintained by a business (e.g., a retail business, a ridehail/rideshare business, a package service business, etc.). The client device 110 may be an application provider communicating information describing applications for execution by the user device 112 or communicating data to the user device 112 for use by an application executing on the user device 112.

The user device 112 is one or more computing devices capable of receiving user input as well as transmitting and/or receiving data via the network. The user device 112 may be a device of an individual. The user device 112 communicates with the client device 110 to request use of the AV 102. For example, the user device 112 may send a ridehail request or user pick up request to the client device 110 through an application executed on the user device 112. The user device 112 may receive from the client device 110 information associated with the request, such as the identity of the user to be picked up, a status of a ridehail/rideshare process, etc. In one embodiment, the user device 112 is a conventional computer system, such as a desktop or a laptop computer. Alternatively, a user device 112 may be a device having computer functionality, such as a personal digital assistant (PDA), a mobile telephone, a smartphone, or another suitable device. A user device 112 is configured to communicate via the network. In one embodiment, a user device 112 executes an application allowing a user of the user device 112 to interact with the fleet management system 108. For example, a user device 112 executes a browser application to enable interaction between the user device 112 and the fleet management system 108 via the network. In another embodiment, a user device 112 interacts with the fleet management system 108 through an application programming interface (API) running on a native operating system of the user device 112, such as IOS® or ANDROID™.

Example Online System

Figure 2:
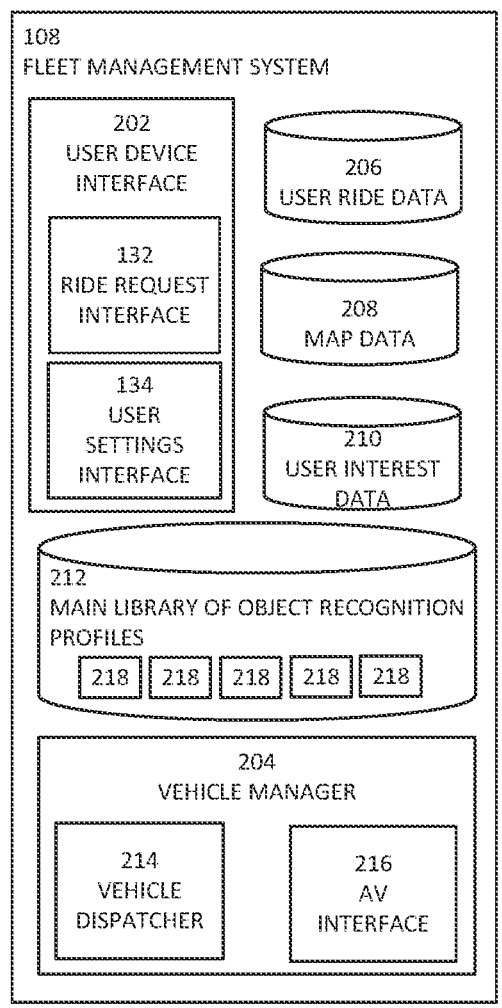
FIG. 2 is a block diagram illustrating a fleet management system according to some embodiments of the present disclosure.

FIG. 2 is a block diagram illustrating the fleet management system 108 according to some embodiments of the present disclosure. The fleet management system 108 can include a user device interface 202, a vehicle manager 204, user ride data 206, map data 208, user interest data 210, and main library of object recognition profiles 212. Each of the user ride data 206, the map data 208, the user interest data 210, and a main library of object recognition profiles 212 can be located in one or more data stores. In some examples, the one or more datastores are one or more databases. The user device interface 202 includes a ride request interface 132 and user settings interface 134. The vehicle manager 204 includes a vehicle dispatcher 214 and an AV interface 216. Alternative configurations, different or additional components may be included in the fleet management system 108. Further, functionality attributed to one component of the fleet management system 108 may be accomplished by a different component included in the fleet management system 108 or a different system (e.g., the onboard controller of an AV 102).

The user device interface 202 is configured to communicate with third-party devices (e.g., the user device 112) that provide a UI to users. For example, the user device interface 202 may be a web server that provides a browser-based application to third-party devices, or the user device interface 202 may be a mobile app server that interfaces with a mobile app installed on third-party devices. For example, the user device interface 202 may provide one or more apps or browser-based interfaces that can be accessed by users, such as the users using user device 112. The user device interface 202 includes the ride request interface 132, that enables the users to submit requests to a ride service provided or enabled by the fleet management system 108. The user device interface 202 further includes the user settings interface 134 that the user can use to select ride settings. The user settings interface 134 may enable the user to opt-in to some, all, or none of the options offered by the ride service provider. The user settings interface 134 may further enable the user to opt-in to certain user device resource usage features (e.g., to opt-in to allow the AV to access the camera on the user device to obtain supplemental image data). The user settings interface 134 may explain how this data is used and may enable users to selectively opt-in to certain user device resource usage features, or to opt-out of all of the user device resource usage features.

The user ride data 206 stores ride information associated with users of the ride service. The user ride data 206 may include an origin location and a destination location for a user's current ride. The map data 450 stores a detailed map of environments through which the AVs 102 may travel. The map data 208 includes data describing roadways, such as e.g., locations of roadways, connections between roadways, roadway names, speed limits, traffic flow regulations, toll information, etc. The user interest data 210 stores data indicating user interests. For example, a learning module may compare locations in the user ride data 206 with map data 208 to identify places the user has visited or plans to visit.

The main library of object recognition profiles 212 includes object recognition profiles 218. Each of the object recognition profiles 218 are an executable set of machine instructions that can be used to identify objects and/or other features in an environment setting based on data captured by a specific sensor. In some examples, the executable set of machine instructions are in binary code. Each sensor can have an object recognition profile 218 associated with the sensor. For example, a first camera on a first cellular telephone or smartphone may have a first object recognition profile 218 while a second camera on a second cellular telephone or smartphone may have a second object recognition profile 218. Each of the object recognition profiles 218 can be created by training a perception module to identify objects and/or other features in an environment setting based on sensor data captured by the specific sensor associated with the object recognition profile 218. The object recognition profile 218 allows the sensor associated with the object recognition profile 218 to recognize, classify, and track objects captured by the sensor.

The vehicle manager 204 manages and communicates with a fleet of AVs (e.g., the AVs 102). The vehicle manager 204 may assign AVs 102 to various tasks and direct the movements of the AVs 102 in the fleet. The vehicle manager 204 includes the vehicle dispatcher 214 and the AV interface 216. The vehicle dispatcher 214 selects AVs from the fleet to perform various tasks and instructs the AVs to perform the tasks. For example, the vehicle dispatcher 214 receives a ride request from the ride request interface 132. The vehicle dispatcher 214 selects an AV 102 to service the ride request based on the information provided in the ride request, (e.g., the origin and destination locations).

The AV interface 216 interfaces with the AVs 102, and in particular, with the onboard controller 104 of the AVs 102. The AV interface 216 allows for bi-directional wireless communication between the fleet management system 108 and AVs 102. The AV interface 216 may receive sensor data from the AVs 102, such as camera images, captured sound, and other outputs from the sensor suite 106.

Example Onboard Controller

FIG. 3 is a block diagram illustrating the onboard controller 104 of the AV 102 according to some embodiments of the present disclosure. The onboard controller 104 includes map data 302, an interface module 304, a localization module 306, a navigation module 308, a sensor interface 310, a perception module 312, a user device interface module 314, a user device location module 316, and a user device resource usage module 318.

The perception module 312 includes one or more object recognition profiles 218. A plurality of object recognition profiles comprises an AV library of object recognition profiles 322. Each of the object recognition profiles 218 are associated with specific sensor. For example, an object recognition profile 218 in the perception module 312 of the onboard controller 104 for the AV 102 can be associated with an external camera 406 (illustrated in FIG. 4) in the sensor suite 106 of the AV 102.

The user device resource usage module 318 can include a processor usage module 324, a sensor usage module 326, and user device object recognition profiles 328. Based on the sensors located in the user device 112, the user device object recognition profiles 328 contain a subset of the main library of object recognition profiles 212 located in the fleet management system 108 and illustrated in FIG. 2. Alternative configurations, different or additional components may be included in the onboard controller 104. Further, functionality attributed to one component of the onboard controller 104 may be accomplished by a different component included in the AV 102 or a different system (e.g., the fleet management system 108). For example, components and modules for conducting route planning, controlling movements of the AV 102, and other vehicle functions are not shown in FIG. 5.

The map data 302 stores a detailed map that includes a current environment of the AV 102. The map data 302 may include any of the map data 208 described in relation to FIG. 2. In some embodiments, the map data 302 stores a subset of the map data 208, (e.g., map data for a city or region in which the AV 102 is located.

The interface module 304 facilitates communications of the onboard controller 104 with other systems. For example, the interface module 304 supports communications of the onboard controller 104 with other systems (e.g., the fleet management system 108). The interface module 304 supports communications of the onboard controller 104 with other components of the AV 102. For example, the interface module 304 may retrieve sensor data generated by the onboard sensor suite 106 and communicate with an UI module of the onboard controller 104.

The localization module 306 localizes the AV 102. The localization module 306 may use sensor data generated by the onboard sensor suite 106 to determine the current location of the AV 102. The sensor data includes information describing an absolute or relative position of the AV 102 (e.g., data generated by GPS, global navigation satellite system (GNSS), IMU, etc.), information describing features surrounding the AV 102 (e.g., data generated by a camera, RADAR, SONAR, LIDAR, etc.), information describing motion of the AV 102 (e.g., data generated by the motion sensor), or some combination thereof. In some embodiments, the localization module 306 uses the sensor data to determine whether the AV 102 has entered a local area, such as a parking garage or parking lot where the AV 102 can be charged. In some other embodiments, the localization module 306 may send the sensor data to the fleet management system 108 and receive from the fleet management system 108 a determination whether the AV 102 has entered the local area.

In some embodiments, the localization module 306 determines whether the AV 102 is at a predetermined location (e.g., a destination of a ridehail/rideshare service). For example, the localization module 306 uses sensor data generated by the onboard sensor suite 106 (or a sensor in the onboard sensor suite 106) to determine the location of the AV 102. The localization module 306 may further compare the location of the AV 102 with the predetermined location to determine whether the AV 102 has arrived. The localization module 306 may provide locations of the AV 102 to the fleet management system 108.

The localization module 306 can further localize the AV 102 within the local area. For example, the localization module 306 determines a pose (position or orientation) of the AV 102 in the local area. In some embodiments, the localization module 306 localizes the AV 102 within the local area by using a model of the local area. The model may be a 2D or 3D representation of the surrounding area, such as a map or a 3D virtual scene simulating the surrounding area. In various embodiments, the localization module 306 receives the model of the local area from the fleet management system 108. The localization module 306 may send a request for the model to the fleet management system 108 and in response, receive the model of the local area. In some embodiments, the localization module 306 generates the request based on sensor data indicating a position or motion of the AV 102. For example, the localization module 306 detects that the AV 102 is in the local area or is navigated to enter the local area based on the sensor data and sends out the request in response to such detection. This process can be dynamic. For example, the localization module 306 may send new request to the fleet management system 108 as the AV 102 changes its position.

The localization module 306 may further localize the AV 102 with respect to an object in the local area. An example of the object is a building in the local area. The localization module 306 may determine a pose of the AV 102 relative to the building based on features in the local area. For example, the localization module 306 retrieves sensor data from one or more sensors (e.g., camera, LIDAR, etc.) in the onboard sensor suite 106 that detect the features. The localization module 306 uses the sensor data to determine the pose of the AV 102. The features may be lane markers, street curbs, driveways, and so on. A feature may be two-dimensional or three-dimensional.

The navigation module 308 controls motion of the AV 102. The navigation module 308 may control the motor of the AV 102 to start, pause, resume, or stop motion of the AV 102. The navigation module 308 may further control the wheels of the AV 102 to control the direction the AV 102 will move. In various embodiments, the navigation module 308 generates a navigation route for the AV 102 based on a location of the AV 102, a destination, and a map. The navigation module 308 may receive the location of the AV 102 from the localization module 306. The navigation module 308 receives a request to go to a location and, using map data 302, generates a route to navigate the AV 102 from its current location, which is determined by the localization module 306, to the location. The navigation module 308 may receive the destination from the fleet management system 108, through the interface module 304.

The sensor interface 310 interfaces with the sensors in the sensor suite 106. The sensor interface 310 may request data from the sensor suite 106 (e.g., by requesting that a sensor capture data in a particular direction or at a particular time). For example, in response to the user device location module 316 or another module determining a location of the user device in the AV 102 (e.g., based on images from an interior camera 410, or other sensors), the sensor interface 310 instructs the user device resource usage module 318 to utilize one or more resources of the user device. As another example, in response to the perception module 312 or another module determining that the one or more users have entered the passenger compartment of the AV 102, the sensor interface 310 instructs one or more of the interior sensors of the AV 102 to become active. The sensor interface 310 is configured to receive data captured by sensors of the sensor suite 106, including data from exterior sensors mounted to the outside of the AV 102, and data from interior sensors mounted in the passenger compartment of the AV 102. The sensor interface 310 may have subcomponents for interfacing with individual sensors or groups of sensors of the sensor suite 106, such as a camera interface, a LIDAR interface, a radar interface, a microphone interface, etc.

The perception module 312 identifies objects and/or other features captured by the sensor suite 106 of the AV 102. For example, the perception module 312 identifies objects in the environment of the AV 102 and captured by one or more sensors of the sensor suite 106 and/or one or more sensors of the user device. The perception module 312 may include one or more object recognition profiles 218 trained using machine learning to identify particular objects. For example, a library of object recognition profiles may be used to recognize or classify each object in the environment of the AV 102 as one of a set of potential objects, (e.g., a vehicle, a pedestrian, or a cyclist). As another example, a pedestrian object of recognition profile recognizes pedestrians in the environment of the AV 102, a vehicle object of recognition profile recognizes vehicles in the environment of the AV 102, etc. The perception module 312 may identify travel speeds of identified objects based on data from a radar sensor, (e.g., speeds at which other vehicles, pedestrians, or birds are traveling). As another example, the perception module 312 may identify distances to identified objects based on data (e.g., a captured point cloud) from a LIDAR sensor, (e.g., a distance to a particular vehicle, building, or other feature identified by the perception module 312). The perception module 312 may also identify other features or characteristics of objects in the environment of the AV 102 based on image data or other sensor data, for example, colors (e.g., the colors of Christmas lights), sizes (e.g., heights of people or buildings in the environment), makes and models of vehicles, pictures and/or words on billboards, etc.

The perception module 312 may further process data from captured by interior sensors (e.g., interior cameras) to determine information about the interior environment in the AV 102. For example, the perception module 312 may perform facial recognition based on image data from the interior cameras to determine which user is seated in which position in the AV 102 and to determine a location of a user device. In some examples, the perception module 312 may use supplementary sensor data from the user device to determine information about the interior environment in the AV 102.

In some embodiments, the perception module 312 fuses data from one or more interior cameras with data from exterior sensors (e.g., exterior cameras 406) and/or map data 302 to identify environmental features being viewed by one or more users. The perception module 312 determines, based on an image of a user, a direction in which the user is looking, (e.g., a vector extending from the user and out of the AV 102 in a particular direction). The perception module 312 compares this vector to data describing features in the environment of the AV 102, including the features' relative location to the AV 102 (e.g., based on real-time data from exterior sensors and/or the AV's real-time location) to identify a feature in the environment being viewed by the user.

While a single perception module 312 is shown in FIG. 3, in some embodiments, the onboard controller 104 may have multiple perception modules (e.g., different perception modules for performing different ones of the perception tasks described above (e.g., object perception, speed perception, distance perception, feature perception, facial recognition, mood determination, sound analysis, gaze determination, etc.)).

The user device interface module 314 allows for bi-directional communication between the onboard controller 104 and the user device. In some examples, the bi-directional communication is wireless communication. The user device location module 316 determines a location of the user device. In some examples, the user device location module 316 can determine a location of the user device based on image data from the interior cameras in the AV 102. In other examples, the user device is placed in a relatively static cradle, holder, stand, docking station, etc. in the AV 102 and the user device location module 316 can determine when the user device is in the cradle, holder, stand, docking station, etc. and use the known location of the cradle, holder, stand, docking station, etc. to infer the location of the user device. In some examples, one or more of the interior sensors 404 can help determine when the user device is in the cradle, holder, stand, docking station, etc.

The user device resource usage module 318 can include the 8processor usage module 324 and the sensor usage module 326. The 8processor usage module 324 can help the onboard controller utilize the processor of the user device. For example, the 8processor usage module 324 can communicate one or more tasks to the processor of the user device to help reduce the workload of the onboard controller 104. In some examples, the processing of the data from the sensors on the user device and the perception detection based on the data from the sensors of the user device can be carried out on the user device rather than by the perception module 312. The sensor usage module 326 can help the onboard controller utilize the sensors of the user device. For example, the sensor usage module 326 can help determine what sensors on the user device are available for use by the onboard controller.

Each of the object recognition profiles 212 are an executable set of machine instructions that can be used to identify objects and/or other features in an environment setting based on data captured by a personal sensor. In some examples, the executable set of machine instructions are in binary code. In some examples, the object recognition profiles 212 in the AV library of object recognition profiles 322 are the same as the object recognition profiles 212 in the main library of object recognition profiles 212 located in the fleet management system 108 and illustrated in FIG. 2. In another example, the object recognition profiles 212 in the AV library of object recognition profiles 322 contain a subset of the object recognition profiles 212 in the main library of object recognition profiles 212 located in the fleet management system 108 and illustrated in FIG. 2. Based on the available sensors on the user device (e.g., as determined by the sensor usage module 326), one or more of the object recognition profiles 212 can be communicated to the user device using the user device interface module 314. A specific object recognition profiles 212 allows the user device to process data from a specific sensor to help to identify environmental features detected by the specific sensor.

Example Sensor Suite

FIG. 4 is a block diagram illustrating the sensor suite 106 of the AV 102 according to some embodiments of the present disclosure. The sensor suite 106 includes one or more exterior sensors 402 and one or more interior sensors 404. The exterior sensors 402 can be located outside of the AV 102 and help to identify environmental features of the environment outside of the AV 102. The interior sensors 404 can be located inside of the AV 102 and help to identify environmental features of the environment inside of the AV 102. The exterior sensors 402 can include one or more exterior cameras 406, at least one LIDAR sensor 408, and other sensors not shown. The interior sensors 404 can include one or more interior cameras 410, at least one LIDAR sensor 412, at least one RADAR sensor 414, at least one interior microphone 416, at least one infrared (IR) sensor 418, at least one NFC sensor 420, at least one beacon sensor 422, and other sensors not shown. Alternative configurations, different or additional components may be included in the sensor suite 106. Further, functionality attributed to one component of the sensor suite 106 may be accomplished by a different component included in the AV 102 or a different system.

The exterior sensors 402 can include one or more exterior cameras 406, at least one LIDAR sensor 408, and other sensors to help determine the environment around the AV 102. For example, the exterior cameras 406 can capture images of the environment around the AV 102. The exterior sensors 402 of the sensor suite 106 may include multiple exterior cameras 406 to capture different views, (e.g., a front-facing camera, a back-facing camera, and side-facing cameras). One or more exterior cameras 406 may be implemented using a high-resolution imager with a fixed mounting and field of view. One or more exterior cameras 406 may have adjustable field of views and/or adjustable zooms. In some embodiments, the exterior cameras 406 capture images continually during operation of the AV 102. The exterior cameras 406 may transmit the captured images to a perception module 312 of the AV 102.

If the exterior sensors 402 of the sensor suite 106 includes a LIDAR sensor 408, the LIDAR sensor 408 measures distances to objects in the vicinity of the AV 102 using reflected laser light. The LIDAR sensor 408 may be a scanning LIDAR that provides a point cloud of the region scanned. The LIDAR sensor 408 may have a fixed field of view or a dynamically field of view. The LIDAR sensor 408 may produce a point cloud that describes, among other things, distances to various objects in the environment of the AV 102. In addition, the exterior sensors 402 may include other sensors. For example, the exterior sensors 402 may include a radar sensor that can measure ranges and speeds of objects in the vicinity of the AV 102 using reflected radio waves. The radar sensor may be implemented using a scanning radar with a fixed field of view or a dynamically Figures field of view. The radar sensor may include one or more articulating radar sensors, long-range radar sensors, short-range radar sensors, or some combination thereof.

The interior sensors 404 can include one or more interior cameras 410, at least one LIDAR sensor 412, at least one RADAR sensor 414, at least one interior microphone 416, at least one IR sensor 418, at least one NFC sensor 420, at least one beacon sensor 422, at least one time of flight sensor 424, and other sensors to identify environmental features of the environment inside of the AV 102. The one or more interior cameras 410 can capture different views of the interior of the AV 102 (e.g., a front-facing camera, a back-facing camera, and side-facing cameras). In some examples, the one or more interior cameras 410 are stereo cameras. The one or more interior cameras 410 may include a high-resolution imager with a fixed mounting and field of view and/or may have adjustable field of views and/or adjustable zooms. In some embodiments, the interior cameras 410 capture images continually during operation of the AV 102. In some embodiments, the one or more interior cameras 410 can be located on or near a front windshield of the AV 102 and/or on or near a back windshield of the AV 102.

The at least one LIDAR sensor 412 can measures distances to objects in the interior of the AV 102 using reflected laser light. The at least one LIDAR sensor 412 may be a scanning LIDAR that provides a point cloud of the region scanned. The at least one LIDAR sensor 412 may have a fixed field of view or a dynamically Figures field of view. The at least one LIDAR sensor 412 may produce a point cloud that describes, among other things, distances to various objects in the environment of the interior of the AV 102. In some embodiments, the at least one LIDAR sensor 412 can be located on or near a front windshield of the AV 102 and/or on or near a back windshield of the AV 102.

The at least one RADAR sensor 414 can measure ranges of objects in interior of the AV 102 using reflected radio waves. The at least one RADAR sensor 414 may be implemented using a scanning radar with a fixed field of view or a dynamically Figures field of view. The at least one RADAR sensor 414 may include one or more articulating radar sensors, long-range radar sensors, short-range radar sensors, or some combination thereof. In some embodiments, the at least one RADAR sensor 414 can be located on or near a front windshield of the AV 102 and/or on or near a back windshield of the AV 102.

The at least one interior microphone 416 can convert sound in the interior of the AV 102 into electrical signals. The sensor suite 106 may have multiple interior microphones 416 at various locations around the interior of the AV 102. The at least one interior microphone 416 may operate continually during operation of the AV 102, or may operate when sound is detected at the microphone and/or when a user is detected within a range of the at least one interior microphone 416.

The at least one IR sensor 418 is a radiation-sensitive optoelectronic component with a spectral sensitivity in the infrared wavelength range of about 780 nm to about 50 µm. In a defined angle range, the at least one IR sensor 418 can detect the heat radiation (infrared radiation) that changes over time and space due to the movement. In some embodiments, the at least one IR sensor 418 can be located on or near a front windshield of the AV 102 and/or on or near a back windshield of the AV 102.

The at least one NFC sensor 420 uses wireless communication with high frequency for data transferring among devices over a distance of about 10 cm or less. Unlike Bluetooth communication, at least one NFC sensor 420 doesn't require any manual pairing or device discovery to transfer data. The at least NFC sensor 420 can be located in an area relatively close to where the user is located or will be located once they enter the AV 102.

The least one beacon sensor 422 is a wireless sensor (e.g., Bluetooth wireless sensor) that receives a signal from a beacon. A beacon is a relatively small, wireless transmitters that use low-energy Bluetooth technology to send signals. The beacon can be used to detect movement (accelerometer), movement (started/stopped moving), button press, temperature, humidity, air pressure, light level, open/closed (magnetic hall effect), proximity (PIR), proximity (cm range), fall detection, smoke, gas, water, NFC, and other conditions and transmit data to the at least one beacon sensor 422. In an example, the user device includes a beacon that communicates the type of user device (e.g., a cellular telephone or smartphone) and/or the type of one or more sensors on the user device. The least one beacon sensor 422 can be located almost anywhere in the interior of the AV 102 that allows for Bluetooth connectively to the beacon.

The at least one time of flight sensor 424 measures the distance between the sensor and an object (e.g., the user device 122), based on the time difference between the emission of a signal and its return to the sensor, after being reflected by an object. The at least one time of flight sensor 424 may use an LED light, infrared light, sound waves, or some other beam or wave that can be emitted from the at least one time of flight sensor 424, reflected off the user device 122, and return to the at least one time of flight sensor 424. The at least one time of flight sensor 424 can be located on or near a front windshield of the AV 102 and/or on or near a back windshield of the AV 102 or anywhere else in the interior of the AV 102 that allows for a clear path to the user device 122.

Example User Device

Figure 5:
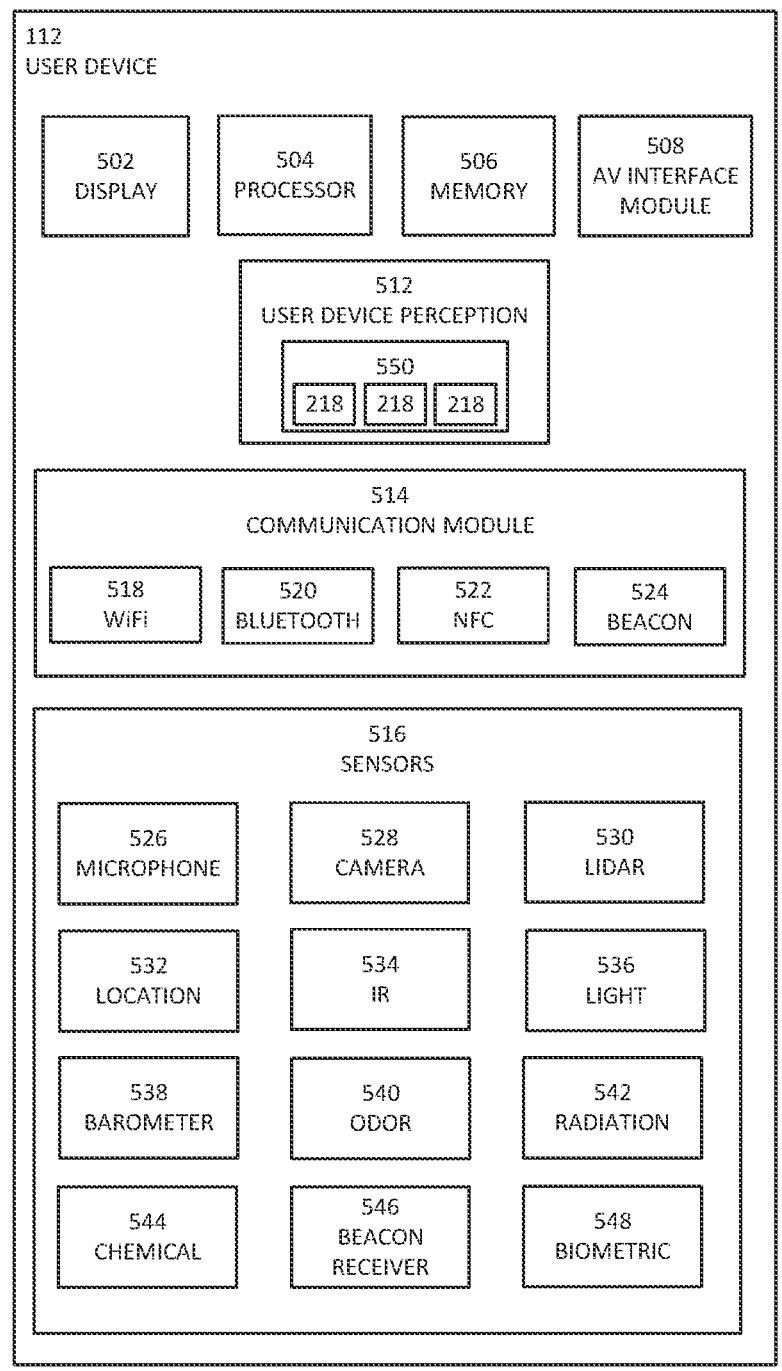
FIG. 5 illustrates a user device according to some embodiments of the present disclosure.

FIG. 5 is a block diagram illustrating an illustrates an example user device according to some embodiments of the present disclosure. The user device 112 includes a display 502, a processor 504, memory 506, an AV interface module 508, a user device perception module 512, a communication module 514, and user device sensors 516. The display 502 can display can provide graphical information to the user. In some examples, the display 502 is a touchscreen display and provides a user interface. In some examples, the processor 504 may be a machine learning processor, neural processor, deep learning processor (DLP) or include a deep learning accelerator. In a specific example, the processor 504 in the user device has about as much compute power or even more compute power than the AV's processor.

The AV interface module 508 is configured to communicate with the user device interface module 314 in the onboard controller 104. The AV interface module 508 allows for bi-directional communication between the user device 112 and the onboard controller 104. In some examples, the bi-directional communication is wireless communication.

The user device perception module 512 includes one or more object recognition profiles 218. The plurality of object recognition profiles comprises a user device library of object recognition profiles 550. Each of the object recognition profiles 218 are associated with specific sensor. For example, an object recognition profile 218 in the user device perception module 512 for the user device 112 can be associated with a camera 528 in the user device sensors 516. If a specific sensor in the user device sensors 516 is the same as a sensor in the sensor suite 106 of the AV 102, the user device perception module 512 in the user device 112 and the perception module 312 in the AV 102 can have the same object recognition profile 218 for the specific sensor. More specifically, if the user device sensors 516 in the user device 112 and the sensor suite 106 of the AV 102 have the same camera, then the object recognition profile 218 associated with the camera can be in the perception module 312 in the AV 102 and the user device perception module 512 in the user device 112. Because the AV 102 will have different sensor than the user device 112, the object recognition profiles 218 in the AV library of object recognition profiles 322 in the AV will be different from the object recognition profiles 218 in the user device library of object recognition profiles 550 in the user device 112.

The user device perception module 512 identifies objects and/or other features captured by one or more of the sensors from user device sensors 516. For example, the user device perception module 512 identifies objects in the interior environment of the AV 102 and captured by one or more sensors from user device sensors 516. In addition, if one or more sensors collect data related to the exterior environment of the AV 102 (e.g., a camera with a viewpoint though a window of the AV 102 to the outside environment), the user device perception module 512 identifies objects in the environment around the AV 102 and captured by one or more sensors from user device sensors 516. The user device perception module 512 can use one or more object recognition profiles 218 from the user device library of object recognition profiles 550 to identify particular objects. In some examples, the user device perception module 512 is similar to the perception module 312 in the onboard controller except the user device perception module 512 used data from the sensors 516 in the user device 112 instead of the sensors from the sensor suite 106 to identify objects, features, characteristics of objects, etc. in the environment of the AV 102.

The communication module 514 helps the communication AV interface module 508 communicate with the user device interface module 314 in the onboard controller 104. The communication module 514 can help facilitate bi-directional wired and wireless communication. In some examples, the communication module 514 includes one or more of a WiFi module 518 to help facilitate WiFi communications, a Bluetooth module 520 to help facilitate Bluetooth™ communications, an NFC module 522 to help facilitate NFC communications, and a beacon 524. The beacon 524 can broadcast a signal that can be detected by the least one beacon sensor 422 in the sensor suite 106.

The sensors 516 can include one or more microphones 526, one or more cameras 528, one or more LIDAR 530, a location module 532, one or more IR detectors 534, one or more light detectors 536, a barometer 538, one or more odor sensors 540, one or more radiation sensors 542, one or more chemical sensors 544, one or more beacon receivers 546, and one or more biometric sensors 548. The sensors 516 may have more types of sensors than those shown in FIG. 5. In other embodiments, the sensors 516 may not include one or more of the sensors shown in FIG. 5.

The one or more microphones 526 can convert sound into electrical signals. The one or more cameras 528, can capture different views from the user device 112 and may include a high-resolution imager with a fixed mounting and field of view and/or may have adjustable field of views and/or adjustable zooms. The one or more LIDAR 530 measures distances to objects in the vicinity of the user device 112 using reflected laser light. The location module 532 may include a global positioning system (GPS) sensor or some other type of sensor or device that can determine a location of the user device 112. The one or more IR detectors 534 is a radiation-sensitive optoelectronic component with a spectral sensitivity in the infrared wavelength range of about 780 nm to about 50 μm. The one or more light detectors 536 can detect the amount of light around the user device 112 by converting light energy into an electrical signal output. The barometer 538 is a sensor that can detect atmospheric pressure in the vicinity of the user device 112. The one or more odor sensors 540 is a sensor that can detect one or more odors in the vicinity of the user device 112. The one or more radiation sensors 542 can detect a level of radiation in the vicinity of the user device 112. In some examples, one or more radiation sensors 542 may be used to track, detect, or identify high-energy particles or radiation from natural or artificial sources such as cosmic radiation, nuclear decay, particle accelerators, and X-rays. The one or more chemical sensors 544 can be a chemical detector that can detect a specific chemical in the area of the user device 112. In general, chemical sensors are specialized sensors or chemical detectors that can detect a specific type of chemical or class of chemicals. For example, some chemical detectors can detect gasses such as methane, some chemical detectors can detect explosives such as nitroglycerin, and other chemical detectors can detect narcotic substances such as marijuana. The one or more beacon receivers 546 is a wireless sensor that receives a signal from a beacon. The one or more biometric sensors 548 can determine one or more biometrics of a user of the user device 112 (e.g., heartrate, skin temperature, pulse, etc.).

Example UIs

Figure 6:
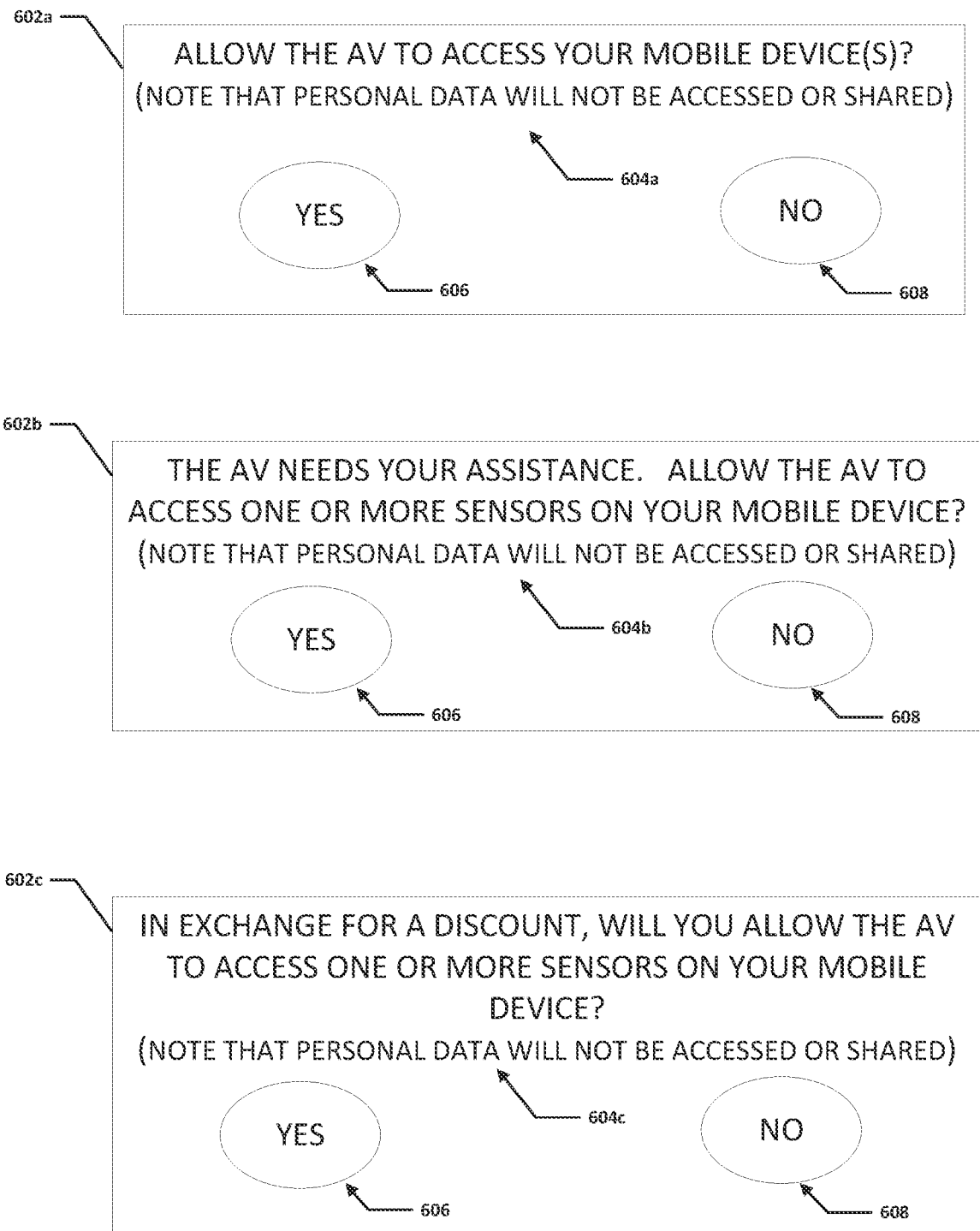
FIG. 6 illustrates examples portions of a user interface according to some embodiments of the present disclosure.

FIG. 6 illustrates various UIs that may be displayed on the display 502 (FIG. 5) according to some embodiments of the present disclosure. In an example, the display 502 can display UI 602a, UI 602b, or UI 602c. The UIs 602a, UI 602b, and UI 602c may be part of a ridehail/rideshare app or some other app related to a service that includes the AV 102 that the user downloaded and installed on the user device 112.

The UI 602a includes a user message 604a, a "YES" user input 606 and a "NO" user input 608. The user message 604a may be a request from the system to allow the AV 102 to access the sensors on the user device 112. If the user is comfortable allowing the AV 102 to access the sensors on the user device 112, the user can select the "YES" user input 606 and the AV 102 may use the data from one or more of sensors 516. If the user is not comfortable allowing the AV 102 to access the sensors on the user device 112, the user can select the "NO" user input 608 and the AV 102 will not use the data from one or more of sensors 516.

The UI 602b includes a user message 604b, the "YES" user input 606 and the "NO" user input 808. The user message 604b may be a request from the system for help supplementing one or more exterior sensors 402 (FIG. 4) of the AV 102 and to allow the AV 102 to access the sensors on the user device 112. For example, an external camera on the AV 102 may be damaged or the AV may be unable to determine if an area where the user will exit the AV is blocked. The AV 102 can request the user position the user device 112 in a location when a sensor (e.g., camera, LIDAR, etc.) on the user device 112 can supplement the sensor data from the exterior sensors 402. If the user is comfortable allowing the AV 102 to access the sensors on the user device 112, the user can select the "YES" user input 606 and the AV 102 may use the data from one or more of sensors 516. If the user is not comfortable allowing the AV 102 to access the sensors on the user device 112, the user can select the "NO" user input 808 and the AV 102 will not use the data from one or more of sensors 516.

The UI 602c includes a user message 604c, the "YES" user input 606 and the "NO" user input 808. The user message 604c may be a request from the system for help supplementing one or more exterior sensors 402 (FIG. 4) of the AV 102 and to allow the AV 102 to access the sensors on the user device 112 in exchange for a discount for use of the AV 102. For example, if the AV 102 is part of a ridehail/rideshare service, the cost of using the AV 102 may be reduced or free in exchange for the user allowing the AV 102 access the sensors on the user device 112. If the user is comfortable allowing the AV 102 to access the sensors on the user device 112, the user can select the "YES" user input 606 and the AV 102 may use the data from one or more of sensors 516. If the user is not comfortable allowing the AV 102 to access the sensors on the user device 112, the user can select the "NO" user input 808 and the AV 102 will not use the data from one or more of sensors 516.

Example System Summary

Figure 7:
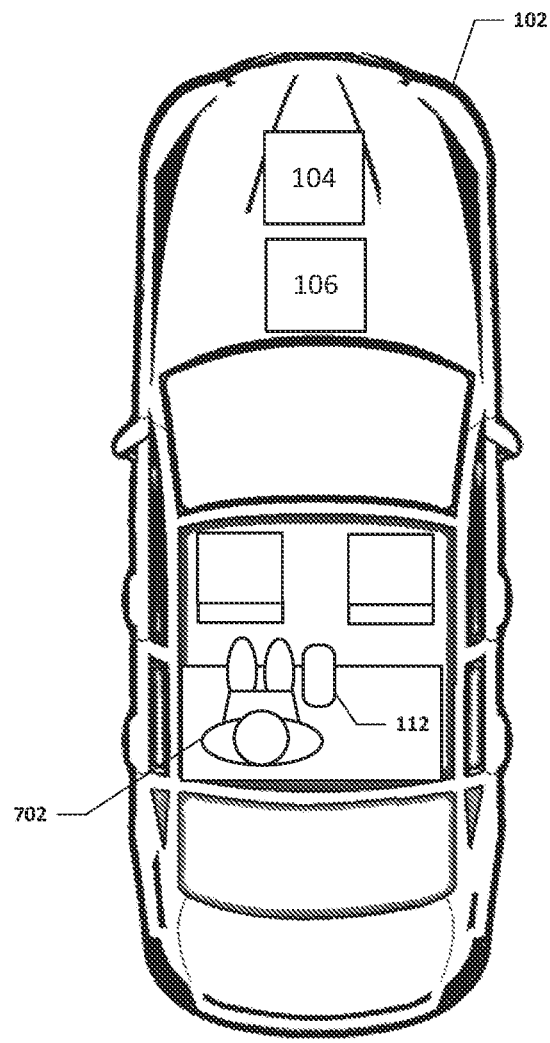
FIG. 7 illustrates an example system summary according to some embodiments of the present disclosure.

FIG. 7 illustrates a user 702 in the AV 102 with the user device 112 according to some embodiments of the present disclosure. The AV 102 can include the onboard controller 104 and the sensor suite 106. When the user 702 enters the AV 102 with the user device 112, the onboard controller 104, or more specifically, the user device interface module 314, can connect to the user device 112 and the AV 102 can supplement the sensors of the AV 102 with one or more sensors on the user device 112. In some examples, the user is asked for permission before the AV 102 connects to the user device 112 and only if the user 702 allows, the AV 102 can supplement the sensors of the AV 102 with one or more sensors on the user device 112. By requiring permission from the user 702, privacy concerns may be addressed.

Figure 8:
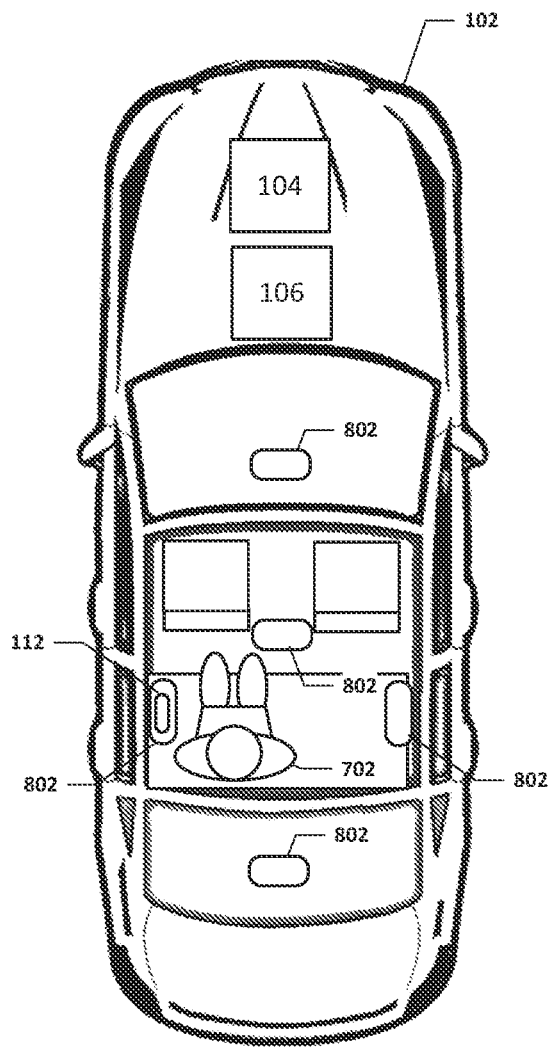
FIG. 8 illustrates an example system summary according to some embodiments of the present disclosure.

FIG. 8 illustrates the user 702 in the AV 102 with the user device 112 according to some embodiments of the present disclosure. The AV 102 can include the onboard controller 104, the sensor suite 106, and one or more user device cradles 802. Each of the one or more user device cradles 802 may be a cradle, holder, stand, docking station, etc. that can support the user device 112 in the AV 102. In some examples, when the user device 112 is in the user device cradle 802, the user device cradle 802 can help charge the user device 112 and/or cool the user device 112. The location of each of the one or more user device cradles 802 can be relatively static such that when the user device 112 is coupled to a specific user device cradle 802, the location of the user device 112 can be inferred. For example, a front facing user device cradle 802 may be located on or near the front of the AV 102 such that when the user couples the user device 112 to the front facing user device cradle 802, one or more sensors on the user device 112 can be used to collect data related to the environment in front of the AV 102. In another example, as illustrated in FIG. 8, a side facing user device cradle 802 may be located on or near a side door window of the AV 102 such that when the user couples the user device 112 to the side facing user device cradle 802, one or more sensors on the user device 112 can be used to collect data related to the environment around the side of the AV 102. In some examples, if the AV 102 needs to use one or more sensors of the user device 112 to help sense the environment around a specific area of the AV 102, a specific user device cradle 802 may illuminate or make a distinct sound to inform the user 702 to place the user device 112 into the specific user device cradle 802.

Figure 9:
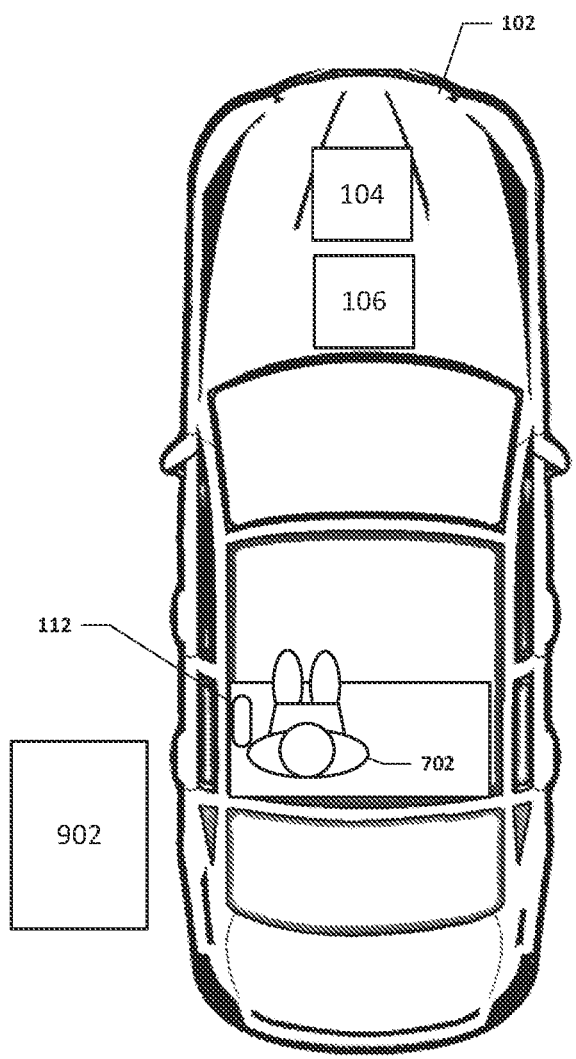
FIG. 9 illustrates an example system summary according to some embodiments of the present disclosure.

FIG. 9 illustrates the user 702 in the AV 102 with the user device 112 according to some embodiments of the present disclosure. The AV 102 can include the onboard controller 104 and the sensor suite 106. In an example, a low obstruction 902 may be blocking a door of the AV 102 and preventing the user 702 from exiting the AV 102. The sensors on the AV 102 may be unable to fully detect the shape of the low obstruction 902 due to the obstruction 902 being partly outside of the field of view of the sensors on the AV 102. In this example, the AV 102 may request that the user 702 allows the AV 102 to access one or more sensors on the user device 112 so the AV 102 can detect the location and shape of the obstruction 902. The AV 102 may instruct the user 702 to hold the user device 112 near a window of the AV 102 to allow a sensor on the user device 112 to collect data related to the location of the obstruction 902 and take an appropriate action (e.g., move the AV 102 forward and away from the obstruction 902).

Figure 10A:
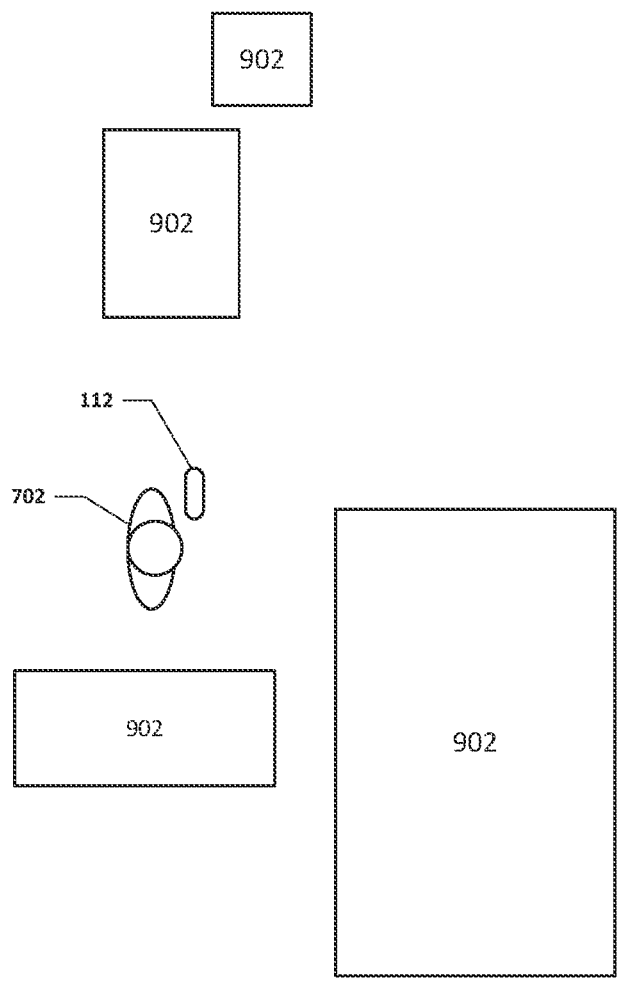
FIGS. 10A and 10B illustrate an example system summary according to some embodiments of the present disclosure.
Figure 10B:
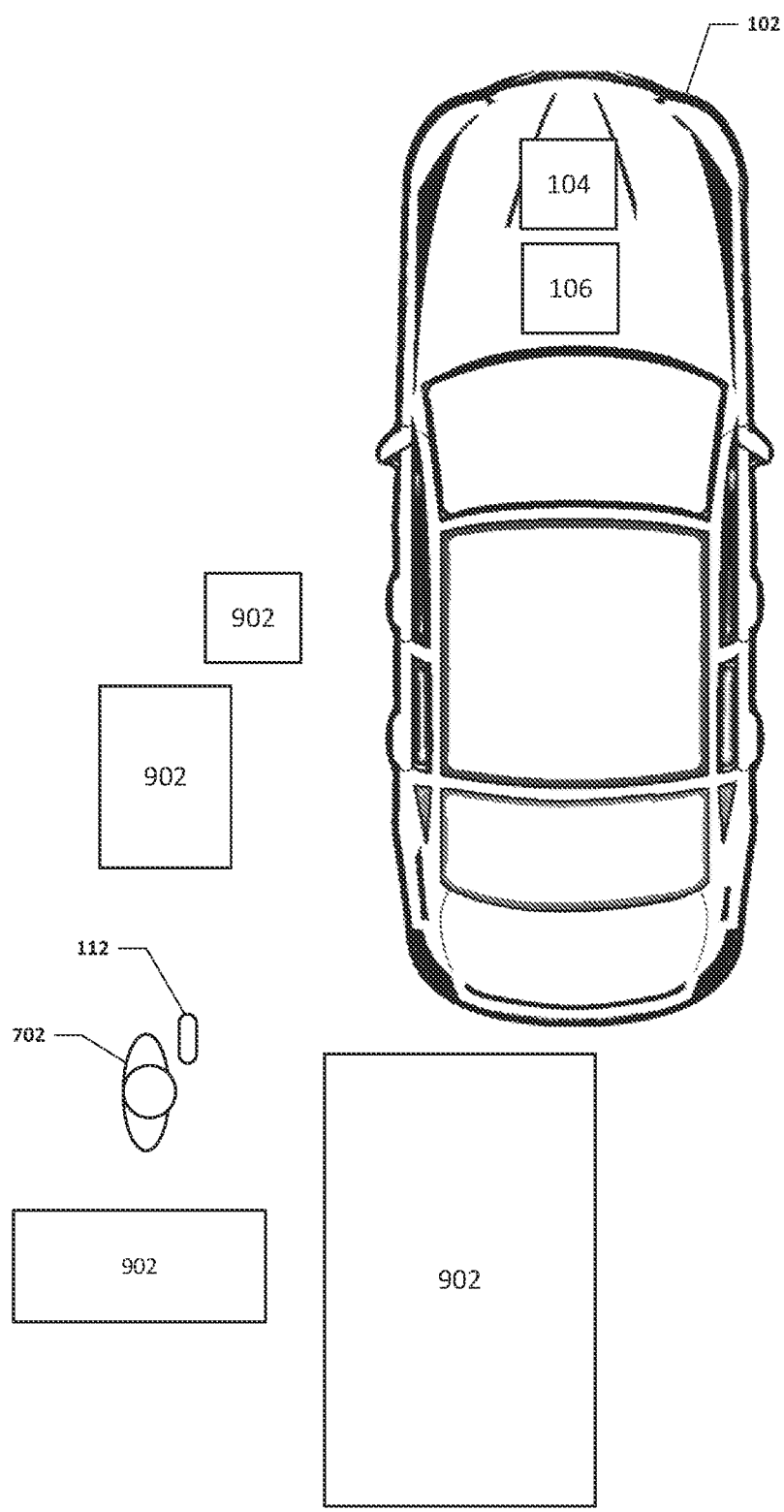

FIGS. 10A and 10B illustrate the user 702 with the user device 112 according to some embodiments of the present disclosure. In an example, the user 702 may have requested a ridehail or rideshare service using the AV 102. As shown in FIG. 10A the user 702 may be surrounded by one or more obstructions 902. The one or more obstructions 902 may be people, structures, equipment, landscape, or some other type of obstruction. The one or more obstructions 902 may cause the AV 102 to have difficultly determining where to stop to allow the user 702 to enter the AV 102. Using the sensors on the user device 112, the user 702 can collect data related to the obstructions 902 and the environment around the user 702 to supplement the sensors on the AV 102. As illustrated in FIG. 10B, using the collected data from the sensors on the user device 112 to supplement the data collected by the sensor suite 106, the onboard controller 104 on the AV 102 can determine where to stop to allow the user to access the AV 102. For example, if the data collected by user device 112 shows it is most convenient for the user 702 to arrive at the AV 102 from a particular path or opening, AV 102 can stop in a way the doors of the AV are aligned with that path or opening.

Figure 11A:
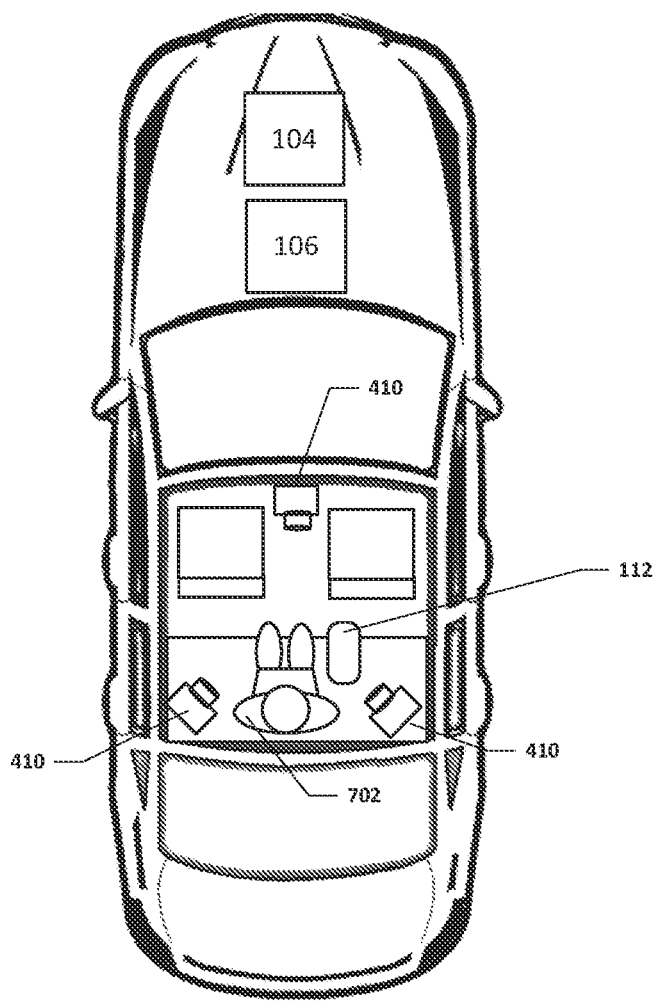
FIGS. 11A and 11B illustrate an example system summary according to some embodiments of the present disclosure.
Figure 11B:
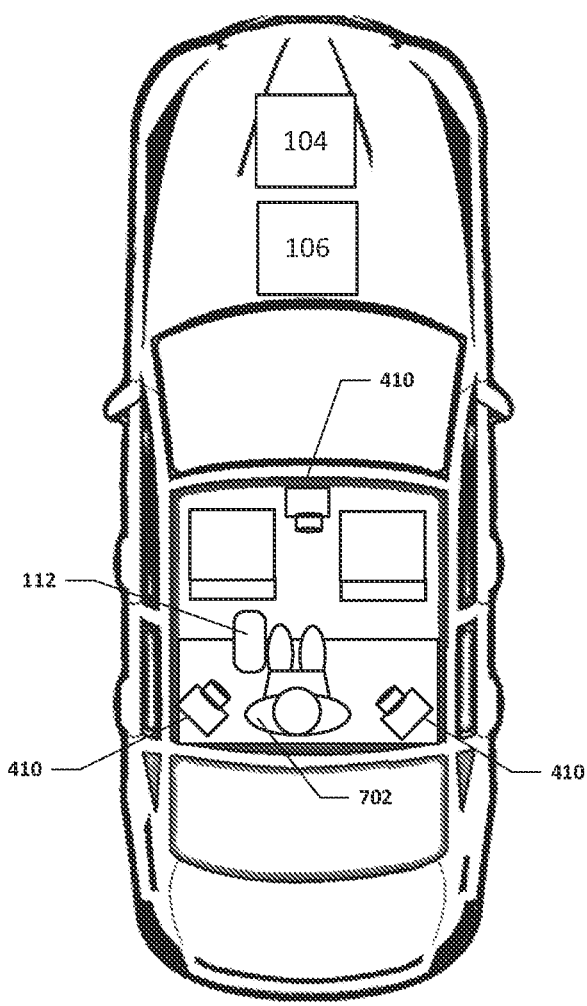

FIGS. 11A and 11B illustrate the user 702 in the AV 102 with the user device 112 according to some embodiments of the present disclosure. The AV 102 can include the onboard controller 104 and the sensor suite 106. The sensor suite 106 can include one or more interior cameras 410. In some examples, data collected by the one or more interior cameras 410 can be used to determine a location, and orientation of the user device 112. In a specific example, the user device location module 316 (FIG. 3) in the onboard controller 104 can collect the data from one or more interior cameras 410 and determine a location, and orientation of the user device 112. In an illustrative example, as shown in FIG. 11A, the user device 112 is on a first side of the user 702. Then, as shown in FIG. 11B, the user device 112 is on the second side of the user 702. The location of the user device 112 may be important because the sensors of the user device 112 will collect different data from different locations. The location and orientation information may be used in the calibration of the sensor data or sensor processing to fix or compensate for any device specific distortions in the sensor data. The location and orientation information may also be used to fuse the objects that are detected by the user device perception 512 with the perception module 312 of the AV. During this fusion the location and orientation information may be used to translate and rotate the object coordinates from the personal device frame of coordinates to the AV frame of coordinates or vice versa.

Figure 12:
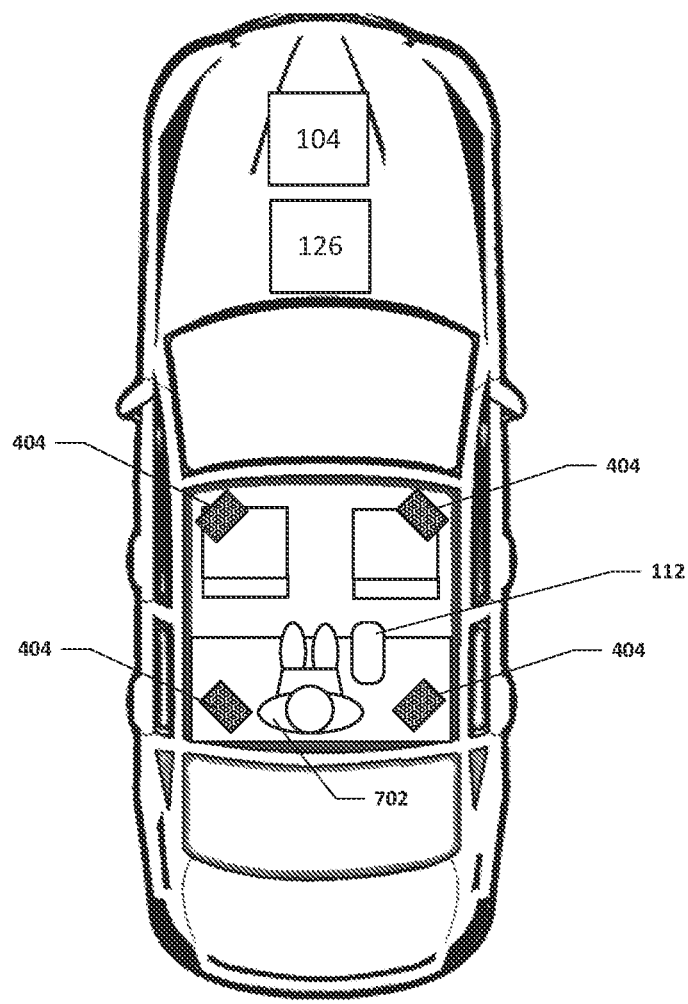
FIG. 12 illustrates an example system summary according to some embodiments of the present disclosure.

FIG. 12 illustrates the user 702 in the AV 102 with the user device 112 according to some embodiments of the present disclosure. The AV 102 can include the onboard controller 104 and the sensor suite 106. The sensor suite 106 can include one or more interior sensors 404. In some examples, data collected by the one or more interior sensors 404 can be used to determine a location of the user device 112. In a specific example, the user device location module 316 (FIG. 3) in the onboard controller 104 can collect the data from one or more of the interior sensors 404 and determine a location of the user device 112. For example, the user device location module 316 (FIG. 3) in the onboard controller 104 can collect the data from the interior LIDAR 412 and determine a location of the user device 112.

Example Process

Figure 13:
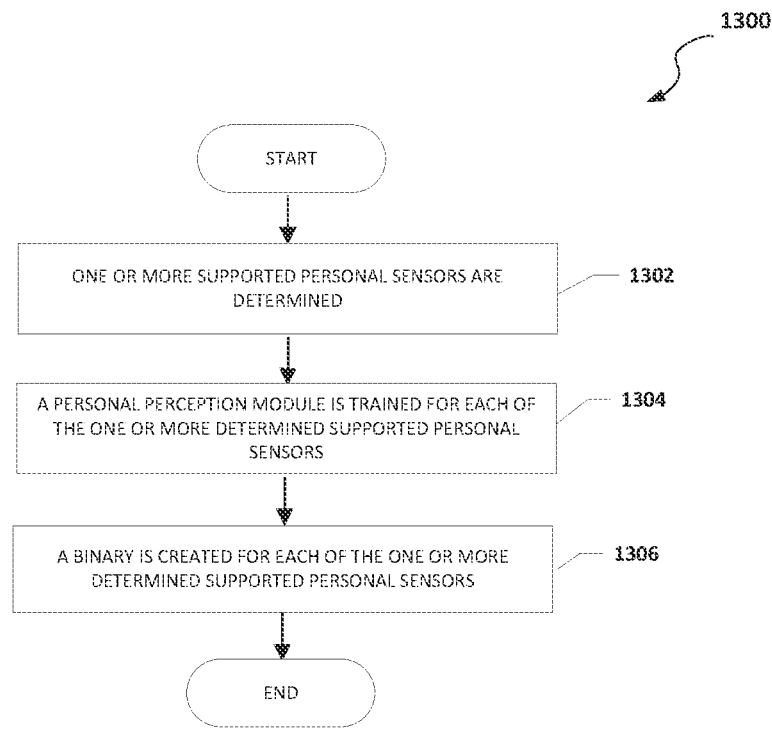
FIG. 13 is a flowchart showing a process for supplementing a vehicle's sensor data according to some embodiments of the present disclosure.

FIG. 13 is an example flowchart illustrating possible operations of a flow 1300 that may be associated with supplementing a vehicle's sensor data, in accordance with an embodiment. In an embodiment, one or more operations of flow 1300 may be performed by the AV 102, the onboard controller 104, the sensor suite 106, the fleet management system 108, and the user device 112.

At 1302, one or more supported personal sensors are determined. For example, the one or more sensors 516 on the user device 112 may be determined. At 1304, a personal perception module is trained for each of the one or more determined supported personal sensors. For example, for each of the determined one or more sensors 516 on the user device 112, the user device perception module 512 can be trained to identify objects in the environment around the user device 112. At 1306, a binary is created for each of the one or more determined supported personal sensors. For example, for each of the determined one or more sensors 516 on the user device 112 where the user device perception module 512 was trained to identify objects in the environment around the user device 112, an object recognition profiles 218 for each sensor can be created. The binaries may be created to be compatible to run on the AV, in a server, or on the user device 112.

Figure 14:
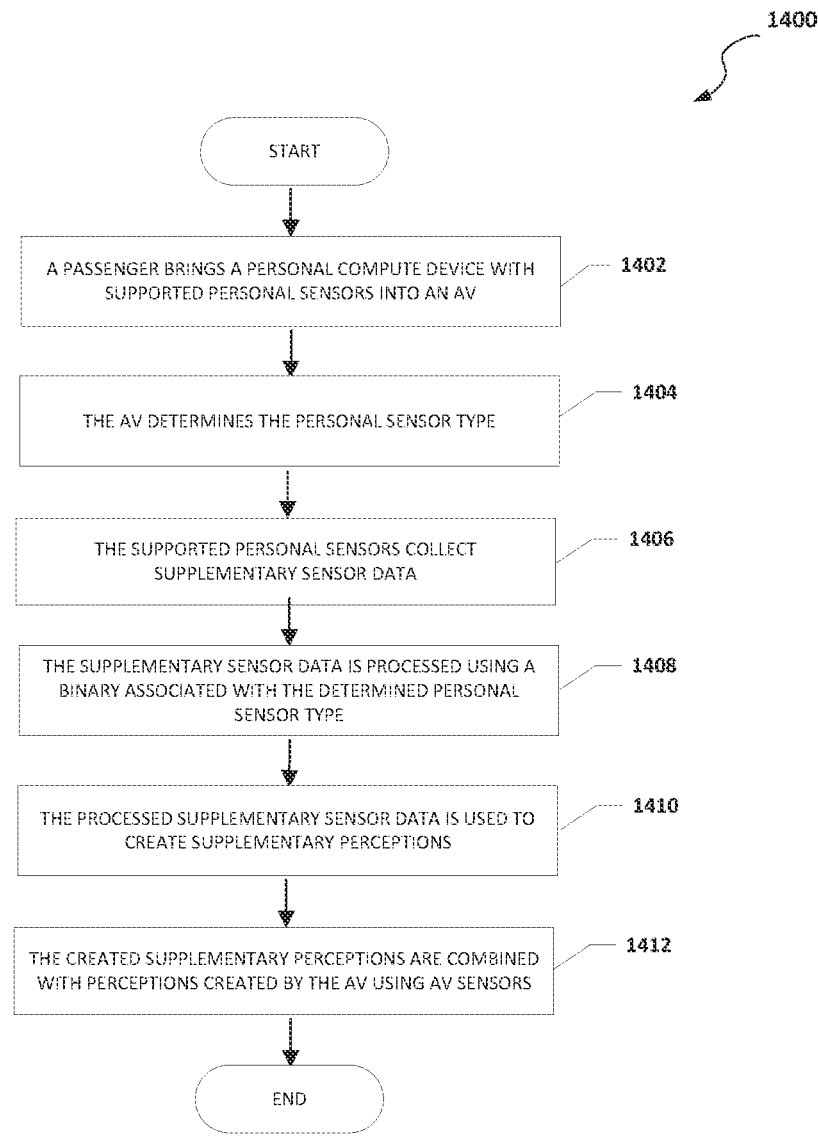
FIG. 14 is a flowchart showing a process for supplementing a vehicle's sensor data according to some embodiments of the present disclosure.

FIG. 14 is an example flowchart illustrating possible operations of a flow 1400 that may be associated with supplementing a vehicle's sensor data, in accordance with an embodiment. In an embodiment, one or more operations of flow 1400 may be performed by the AV 102, the onboard controller 104, the sensor suite 106, the fleet management system 108, and the user device 112.

At 1402, a passenger brings a personal compute device with supported personal sensors into an AV. For example, the user 702 can bring the user device 112 into the AV 102. The user device 112 can include one or more sensors 516 that have an associated object recognition profile 218. The user device 112 may be brought in users' hand, or by first putting the device in a bag or container, and then bringing the container in. The user device 112 may be located in a personal holster, or may be placed in a dedicated holster in the AV. At 1404, the AV determines the personal sensor type. For example, the sensor usage module 326 in the user device resource usage module 318 of the onboard controller 104 can determine the personal sensor type of each supported sensor 516. At 1406, the supported personal sensors collect supplementary sensor data. For example, the one or more sensors 516 that have an associated object recognition profile 218 can collect sensor data that can be used to supplement the sensors from the sensor suite 106 of the AV 102. The activation of the sensor may be based on user prompt as a result of user interaction with an interface such as that in 602a, 602b, or 602c. The sensor that needs to be activated, and timing and duration of the activation may be determined by the AV. For example, the sensor may be activated after a 2 second delay after user makes the prompt. The sensor may remain active as long as the necessity of the additional sensor is present. For example, if there is an obstruction, the sensor may remain active as long as the obstruction is present around the AV. As another example, the sensor may be activated as long the user is in the AV. At 1408, the supplementary sensor data is processed using a binary associated with the determined personal sensor type. For example, the sensor data from each supported sensor 516 can be processed with the associated object recognition profile 218. The processing of the supported sensor 516 data can be performed on the AV 102 or the user device. At 1410, the processed sensor data is used to create supplementary perceptions. For example, after the sensor data from each supported sensor 516 is processed with the associated object recognition profile 218, the user device perception module 512 can be used to create supplementary perceptions. At 1412, the created supplementary perceptions are combined with perceptions created by the AV using AV sensors. For example, the supplementary perceptions created by the user device perception module 512 can be used to supplement the perceptions created by the perception module 312 from data collected by the sensor suite 106 in the AV 102. If the supplementary perceptions and perceptions are found to be overlapping, only the overlapping information from one of the perceptions will be retained. The retained perception may be the one that is deemed to be higher quality and less uncertainty. As an example, if bounding boxes are produced by perception modules, an IOU (intersection over union) value can be calculated between the bounding boxes from the supplementary perception and perception modules, and if the IOU exceeds a certain threshold, the bounding box with the highest uncertainty is discarded.

Figure 15:
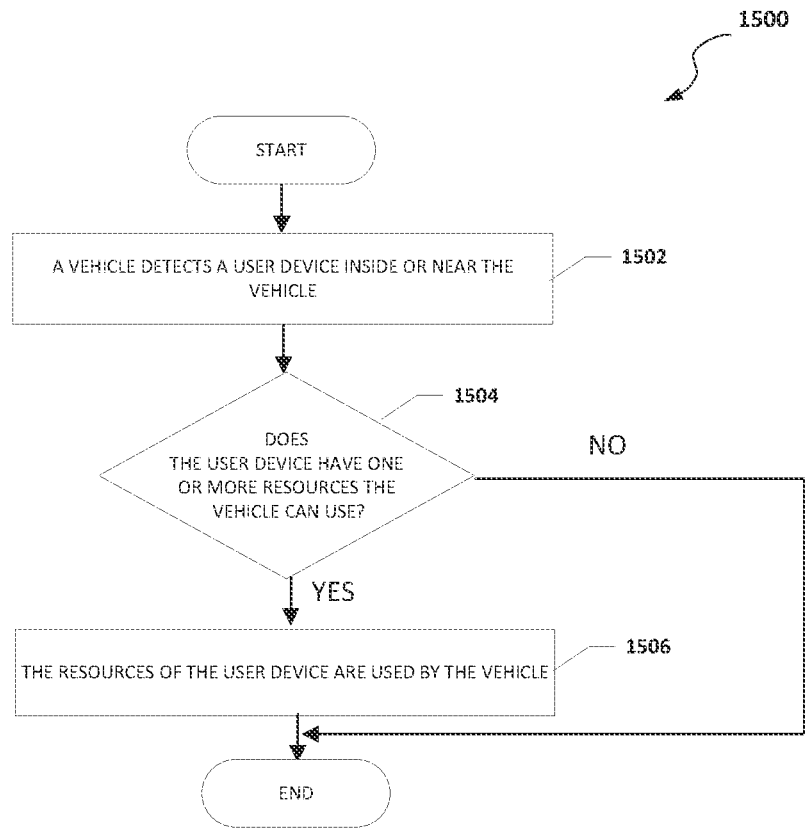
FIG. 15 is a flowchart showing a process for supplementing a vehicle's sensor data according to some embodiments of the present disclosure.

FIG. 15 is an example flowchart illustrating possible operations of a flow 1500 that may be associated with supplementing a vehicle's sensor data, in accordance with an embodiment. In an embodiment, one or more operations of flow 1500 may be performed by the AV 102, the onboard controller 104, the sensor suite 106, the fleet management system 108, and the user device 112.

At 1502, a vehicle detects a user device inside or near the vehicle. For example, the user device location module 316 in the onboard controller 104 can detect the user device 112 inside or near the AV 102. At 1504, the system determines if the user device has one or more resources that the vehicle can use. For example, the user device resource usage module 318 in the onboard controller can determine if the user device 112 has one or more sensors 516 that the AV 102 can use to supplement the sensors in the sensor suite 106 of the AV 102. As another example, if the personal device has the sensors, but if the battery status of the personal device indicate that personal device doesn't have the necessary power, then resource is considered unavailable. If the user device does not have one or more resources that the vehicle can use, the flow ends. If the user device has one or more resources that the vehicle can use, then the resources of the user device are used by the vehicle at 1506. For example, the AV 102 can use one or more sensors 516 in the user device 112 to supplement the sensors in the sensor suite 106 of the AV 102.

Figure 16:
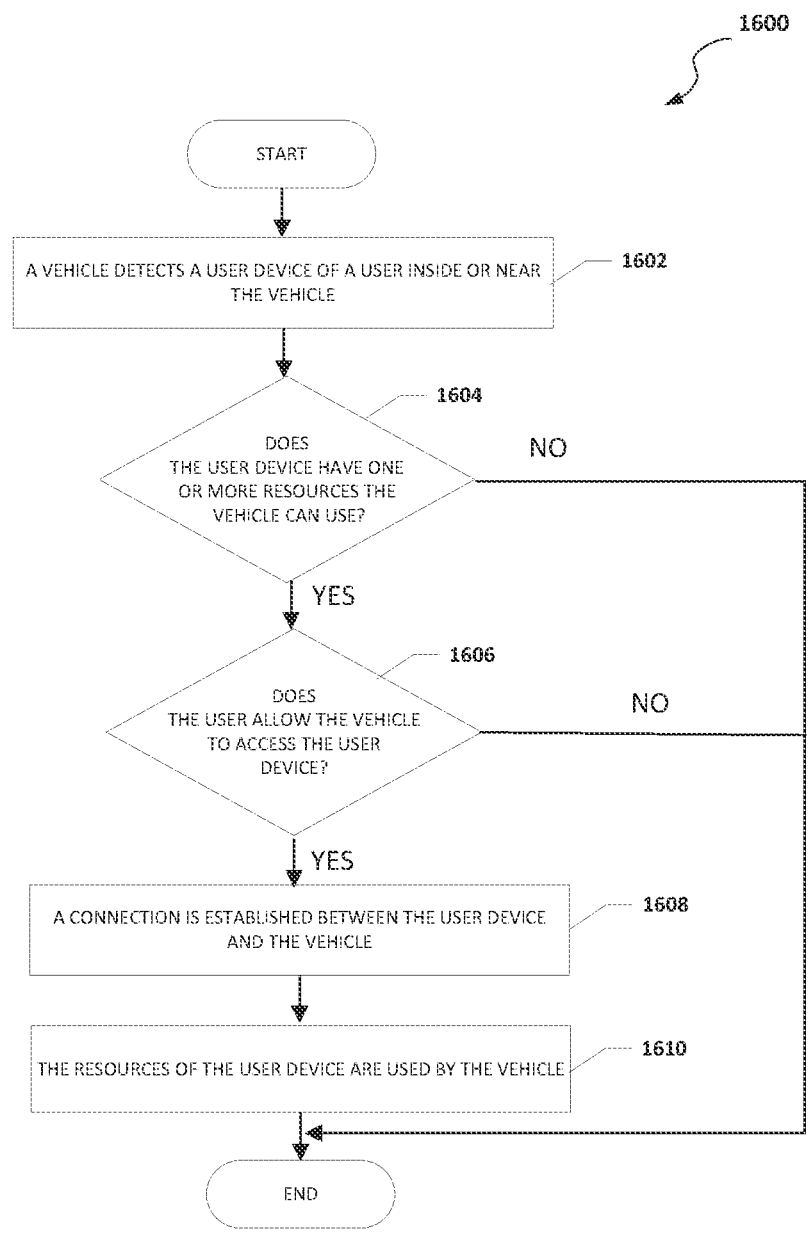
FIG. 16 is a flowchart showing a process for supplementing a vehicle's sensor data according to some embodiments of the present disclosure.

FIG. 16 is an example flowchart illustrating possible operations of a flow 1600 that may be associated with supplementing a vehicle's sensor data, in accordance with an embodiment. In an embodiment, one or more operations of flow 1600 may be performed by the AV 102, the onboard controller 104, the sensor suite 106, the fleet management system 108, and the user device 112.

At 1602, a vehicle detects a user device inside or near the vehicle. For example, the user device location module 316 in the onboard controller 104 can detect the user device 112 inside or near the AV 102. At 1604, the system determines if the user device has one or more resources that the vehicle can use. For example, the user device resource usage module 318 in the onboard controller can determine if the user device 112 has one or more sensors 516 that the AV 102 can use to supplement the sensors in the sensor suite 106 of the AV 102. If the user device does not have one or more resources that the vehicle can use, the flow ends. If the user device has one or more resources that the vehicle can use, then the system determines if the user allows the vehicle to access the user device, as in 1606. For example, if the user device 112 has one or more resources that the AV 102 can use, then the system may use a UI 602a, 602b, or 602c to ask the user 702 if the AV 102 can use one or more sensors 516 of the user device 112. If the user does not allow the vehicle to access the user device, the flow ends. If the user allows the vehicle to access the user device, then a connection is established between the user device and the vehicle, as in 1608. For example, the user device interface module 314 in the onboard controller 104 and the AV interface module 508 in the user device 112 can be used to established a connection between the AV 102 and the user device. At 1610, the resources of the user device are used by the vehicle. For example, the AV 102 can use one or more sensors 516 in the user device 112 to supplement the sensors in the sensor suite 106 of the AV 102.

Figure 17:
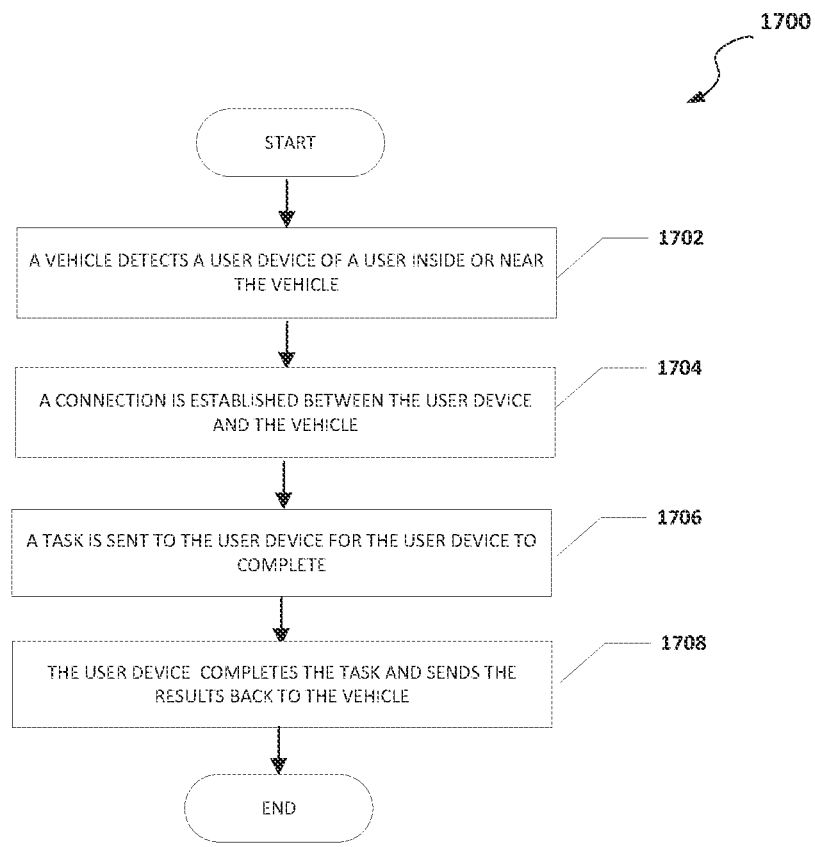
FIG. 17 is a flowchart showing a process for using a device's resources according to some embodiments of the present disclosure.

FIG. 17 is an example flowchart illustrating possible operations of a flow 1700 that may be associated with a process for using a device's resources, in accordance with an embodiment. In an embodiment, one or more operations of flow 1700 may be performed by the AV 102, the onboard controller 104, the sensor suite 106, the fleet management system 108, and the user device 112.

At 1702, a vehicle detects a user device inside or near the vehicle. For example, the user device location module 316 in the onboard controller 104 can detect the user device 112 inside or near the AV 102. At 1704, a connection is established between the user device and the vehicle, as in 1608. For example, the user device interface module 314 in the onboard controller 104 and the AV interface module 508 in the user device 112 can be used to established a connection between the AV 102 and the user device. At 1706, a task is sent to the user device for the user device to complete. For example, the 8processor usage module 324 can send a task to the processor in the user device 112 to offload some of the workload of the onboard controller 104. In another example, the sensor usage module 326 can send a task to the user device 112 to collect data from one or more sensors 516 in the user device 112 to use the more sensors 516 in the user device 112 to supplement the sensors in the sensor suite 106 of the AV 102. At 1708, the user device completes the task and sends the results back to the vehicle.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configure ration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configure ration (e.g., programmable) elements arranged in a structure that supports these functions. The software or firmware providing the emulation may be provided on non-transitory computer-readable storage medium comprising instructions to allow a processor to carry out those functionalities.

Additionally, one or more of the AV 102, the onboard controller 104, the sensor suite 106, the fleet management system 108, and the user device 112 may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an application specific integrated circuit (ASIC) that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Each of the AV 102, the onboard controller 104, the sensor suite 106, the fleet management system 108, and the user device 112 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Each of the AV 102, the onboard controller 104, the sensor suite 106, the fleet management system 108, and the user device 112 can include memory elements for storing information to be used in the operations outlined herein. The AV 102, the onboard controller 104, the sensor suite 106, the fleet management system 108, and the user device 112 may keep information in any suitable memory element (e.g., random access memory (RAM), read-only memory (ROM), erasable programmable ROM (EPROM), electrically erasable programmable ROM (EEPROM), ASIC, etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the AV 102, the onboard controller 104, the sensor suite 106, the fleet management system 108, and the user device 112 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these examples, memory elements can store data used for the operations described herein. This includes the memory elements being able to store software, logic, code, or processor instructions that are executed to carry out the activities described herein.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

OTHER NOTES AND EXAMPLES

Example M1 is a method including identifying the personal sensor on the user device, communicating a library of object recognition profiles for the personal sensor to the user device, capturing personal sensor data related to an environment, using the library of object recognition profiles for the personal sensor to use the captured personal sensor data to identify objects and/or features in the environment, and using the identified objects and/or features in the environment to supplement data collected by the vehicle's sensors.

In Example M2, the subject matter of Example M1 can optionally include determining a location or orientation of the user device and using the location or orientation of the user device in supplementing the data collected by the vehicle's sensors.

In Example M3, the subject matter of Example M2 can optionally include where supplementing the data collected by the vehicle's sensors includes translating and rotating the spatial data from the personal sensor based on the determined location and orientation of the user device.

In Example M4, the subject matter of Example M1 can optionally include where the library of object recognition profiles for the personal sensor are stored on the user device and are used by the user device to identify objects and/or features in the environment based on the captured personal sensor data.

In Example M5, the subject matter of Example M1 can optionally include identifying the personal sensor on the user device, training a personal perception module to identify objects and/or other features in an environment setting based on data captured by the personal sensor, and using the training from the personal perception module to create the library of object recognition profiles for the personal sensor.

In Example, M6, the subject matter of Example M1 can optionally include where the library of object recognition profiles are an executable set of machine instructions.

In Example, M7, the subject matter of Example M6 can optionally include where the executable set of machine instructions are in binary code.

In Example, M8, the subject matter of Example M1 can optionally include where the library of object recognition profiles for the personal sensor are stored in a network element.

In Example, M9, the subject matter of Example M8 can optionally where the library of object recognition profiles for the personal sensor are communicated to the vehicle after the user device that includes the personal sensor is identified.

In Example, M10, the subject matter of Example M1 can optionally include where the library of object recognition profiles for the personal sensor are stored in the vehicle.

In Example, M11, the subject matter of Example M1 can optionally include where the identified objects and/or features in the environment were not detected by the sensors on the vehicle.

In Example, M12, the subject matter of Example M1 can optionally include where the personal sensor is a camera.

In Example, M13, the subject matter of Example M1 can optionally include where the personal sensor is a LIDAR sensor.

In Example, M14, the subject matter of Example M1 can optionally include where the personal sensor is a sensor that is not on the vehicle.

In Example, M15, the subject matter of Example M1 can optionally include where the personal sensor on the user device is used to identify the objects and/or other features in the environment before the vehicle is physically in the environment.

In Example, M16, the subject matter of Example M1 can optionally include where a user of the user device is requested for permission to use the personal sensor on the user device before the personal sensor is used to acquire data.

In Example, M17, the subject matter of Example M1 can optionally include where a user of the user device is requested to position the user device in a certain position to allow the personal sensor on the user device to acquire data.

In Example, M18, the subject matter of Example M1 can optionally include where a user of the user device is requested to insert the user device in a user device holder in the vehicle to allow the personal sensor on the user device to acquire data.

In Example, M19, the subject matter of Example M1 can optionally include where the user device is a cellular phone or smart phone.

In Example M20, the subject matter of any of Examples M1-M3 can optionally include where the library of object recognition profiles for the personal sensor are stored on the user device and are used by the user device to identify objects and/or features in the environment based on the captured personal sensor data.

In Example M21, the subject matter of any of Examples M1-M4 can optionally include identifying the personal sensor on the user device, training a personal perception module to identify objects and/or other features in an environment setting based on data captured by the personal sensor, and using the training from the personal perception module to create the library of object recognition profiles for the personal sensor.

In Example, M22, the subject matter of any of Examples M1-M5 can optionally include where the library of object recognition profiles are an executable set of machine instructions.

In Example, M23, the subject matter of Example M6 can optionally include where the executable set of machine instructions are in binary code.

In Example, M24, the subject matter of any of Examples M1-M7 can optionally include where the library of object recognition profiles for the personal sensor are stored in a network element.

In Example, M25, the subject matter of any of Examples M1-M8 can optionally where the library of object recognition profiles for the personal sensor are communicated to the vehicle after the user device that includes the personal sensor is identified.

In Example, M26, the subject matter of any of the Examples M1-M9 can optionally include where the library of object recognition profiles for the personal sensor are stored in the vehicle.

In Example, M27, the subject matter of any of the Examples M1-M10 can optionally include where the identified objects and/or features in the environment were not detected by the sensors on the vehicle.

In Example, M28, the subject matter of any of the Examples M1-M11 can optionally include where the personal sensor is a camera.

In Example, M29, the subject matter of any of the Examples M1-M12 can optionally include where the personal sensor is a LIDAR sensor.

In Example, M30, the subject matter of any of the Examples M1-M13 can optionally include where the personal sensor is a sensor that is not on the vehicle.

In Example, M31, the subject matter of any of the Examples M1-M14 can optionally include where the personal sensor on the user device is used to identify the objects and/or other features in the environment before the vehicle is physically in the environment.

In Example, M32, the subject matter of any of the Examples M1-M15 can optionally include where a user of the user device is requested for permission to use the personal sensor on the user device before the personal sensor is used to acquire data.

In Example, M33, the subject matter of any of any of the Examples M1-M16 can optionally include where a user of the user device is requested to position the user device in a certain position to allow the personal sensor on the user device to acquire data.

In Example, M34, the subject matter of any of the Examples M1-M17 can optionally include where a user of the user device is requested to insert the user device in a user device holder in the vehicle to allow the personal sensor on the user device to acquire data.

In Example, M35, the subject matter of any of the Examples M1-M18 can optionally include where the user device is a cellular phone or smart phone.

Example A1, is a vehicle for supplementing vehicle sensor data with-supplemental sensor data from one or more sensors on a user device, the vehicle comprising a sensor suite including external vehicle sensors to sense an environment and generate sensor data, a perception system to receive the sensor data and to acquire map data and to use the map data and the sensor data to generate vehicle real world environment data, a user device interface module to communicate with the user device, and a user device resource usage module to use supplemental sensor data from one or more sensors on the user device to supplement the sensor data.

In Example A2, the subject matter of Example A1 can optionally include where the user device interface module communicates a library of object recognition profiles for each of the one or more sensors on the user device.

In Example A3, the subject matter of Example A2 can optionally include where the user device uses the library of object recognition profiles to generate real world supplemental environment data.

In Example A4, the subject matter of Example A3 can optionally include where the real world supplemental environment data includes data related to objects and/or features that are not included in the vehicle real world environment data.

In Example A5, the subject matter of Example A1 can optionally include where the vehicle communicates a message to a user of the user device to position the user device in a specific area.

In Example A6, the subject matter of Example A1 can optionally include a user device cradle to fix a position of the one or more sensors on the user device in a specific location.

In Example A7, the subject matter of Example A1 can optionally include where the user device cradle charges the user device when the user device is coupled to the user device cradle.

In Example A8, the subject matter of any of Examples A1-A2 can optionally include where the user device uses the library of object recognition profiles to generate real world supplemental environment data.

In Example A9, the subject matter of any of Examples A1-A3 can optionally include where the real world supplemental environment data includes data related to objects and/or features that are not included in the vehicle real world environment data.

In Example A10, the subject matter of any of Examples A1-A4 can optionally include where the vehicle communicates a message to a user of the user device to position the user device in a specific area.

In Example A11, the subject matter of any of Examples A1-A5 can optionally include a user device cradle to fix a position of the one or more sensors on the user device in a specific location.

In Example A12, the subject matter of any of Examples A1-A6 can optionally include where the user device cradle charges the user device when the user device is coupled to the user device cradle.

Example MM1 is a method including determining that sensor data from an autonomous vehicle's sensors needs to be supplemented with supplementary sensor data, identifying a user device that includes a supplementary sensor that can collect the supplementary sensor data, communicating a library of object recognition profiles for the supplementary sensor to the user device, capturing the supplementary sensor data, using the library of object recognition profiles for the supplementary sensor to execute the captured supplementary sensor data to identify objects and/or features in an environment around the user device, and using the identified objects and/or features in the environment around the user device to supplement the sensor data collected by the autonomous vehicle's sensors.

In Example MM2, the subject matter of Example MM1 can optionally include identifying the supplementary sensor on the user device, training a personal perception module to identify objects and/or other features in an environment setting based on data captured by the supplementary sensor, and using the training from the personal perception module to create the library of object recognition profiles for the supplementary sensor.

In Example MM3, the subject matter of Example MM1 can optionally include where the library of object recognition profiles are an executable set of machine instructions.

In Example MM4, the subject matter of Example MM1 can optionally include where the library of object recognition profiles for the supplementary sensor are stored in a network element and communicated to the autonomous vehicle after the user device that includes the supplementary sensor is identified.

In Example MM5, the subject matter of any of Example MM4 can optionally include where the library of object recognition profiles for the supplementary sensor are stored in the autonomous vehicle.

In Example, MM6, the subject matter of Example MM1 can optionally include where the identified objects and/or features in the environment were not detected by the sensors on the autonomous vehicle.

In Example, MM7, the subject matter of Example MM1 can optionally include where the sensor is a camera and the supplementary sensor data is collected through a passenger window of the autonomous vehicle.

In Example, MM8, the subject matter of Example MM1 can optionally include where the sensor is LIDAR and the supplementary sensor data is collected through a passenger window of the autonomous vehicle.

In Example, MM9, the subject matter of Example MM1 can optionally include where a user of the user device is requested to position the user device in a certain position to allow the supplementary sensor on the user device to acquire data.

In Example, MM10, the subject matter of Example MM9 can optionally include where a user of the user device is requested to insert the user device in a user device holder in the autonomous vehicle to allow the supplementary sensor on the user device to acquire data.

In Example, MM11, the subject matter of Example MM10 can optionally include where a user of the user device is requested for permission to use the supplementary sensor on the user device before the supplementary sensor is used to acquire data.

In Example, MM12, the subject matter of Example MM1 can optionally include where the user device is a cellular phone or smartphone.

In Example MM13, the subject matter of any of the Examples MM1-MM2 can optionally include where the library of object recognition profiles are an executable set of machine instructions.

In Example MM14, the subject matter of any of the Examples MM1-MM3 can optionally include where the library of object recognition profiles for the supplementary sensor are stored in a network element and communicated to the autonomous vehicle after the user device that includes the supplementary sensor is identified.

In Example MM15, the subject matter of any of the Examples MM1-MM4 can optionally include where the library of object recognition profiles for the supplementary sensor are stored in the autonomous vehicle.

In Example, MM16, the subject matter of any of the Examples MM1-MM5 can optionally include where the identified objects and/or features in the environment were not detected by the sensors on the autonomous vehicle.

In Example, MM17, the subject matter of any of the Examples MM1-MM6 can optionally include where the sensor is a camera and the supplementary sensor data is collected through a passenger window of the autonomous vehicle.

In Example, MM18, the subject matter of any of the Examples MM1-MM7 can optionally include where the sensor is LIDAR and the supplementary sensor data is collected through a passenger window of the autonomous vehicle.

In Example, MM19, the subject matter of any of the Examples MM1-MM8 can optionally include where a user of the user device is requested to position the user device in a certain position to allow the supplementary sensor on the user device to acquire data.

In Example, MM20, the subject matter of any of the Examples MM1-MM9 can optionally include where a user of the user device is requested to insert the user device in a user device holder in the autonomous vehicle to allow the supplementary sensor on the user device to acquire data.

In Example, MM21, the subject matter of any of the Examples MM1-MM10 can optionally include where a user of the user device is requested for permission to use the supplementary sensor on the user device before the supplementary sensor is used to acquire data.

In Example, MM22, the subject matter of any of the Examples MM1-MM11 can optionally include where the user device is a cellular phone or smartphone.

Example AA1 is a device including at least one machine-readable medium comprising one or more instructions that, when executed by at least one processor, causes the at least one processor to determine that sensor data from an autonomous vehicle's sensors needs to be supplemented with supplementary sensor data, identify a supplementary sensor on a user device, where the supplementary sensor can provide the supplementary sensor data, if a user of the user device allows the supplementary sensor to be accessed, communicate a library of object recognition profiles for the supplementary sensor to the user device, capture supplementary sensor data related to an environment in a vicinity of the user device, use the library of object recognition profiles for the supplementary sensor to use the captured supplementary sensor data to identify objects and/or features in the environment in the vicinity of the user device, and use the identified objects and/or features in the environment to supplement data collected by the autonomous vehicle's sensors.

In Example AA2, the subject matter of Example AA1 can optionally include where the library of object recognition profiles are an executable set of machine instructions.

In Example AA3, the subject matter of Example AA2 can optionally include where the library of object recognition profiles for the supplementary sensor are stored in a network element and communicated to the autonomous vehicle after the user device that includes the supplementary sensor is identified.

In Example AA4, the subject matter of Example AA1 can optionally include where the identified objects and/or features in the environment were not detected by the sensors on the autonomous vehicle.

In Example AA5, the subject matter of Example AA1 can optionally include one or more instructions that, when executed by at least one processor, causes the at least one processor to communicate a request to the user for the user to position the user device in a specific location to allow the supplementary sensor on the user device to acquire the supplementary sensor data.

In Example AA6, the subject matter of Example AA1 can optionally include one or more instructions that, when executed by at least one processor, causes the at least one processor to communicate a request to the user for the user to place the user device in a user device holder in the autonomous vehicle to allow the supplementary sensor on the user device to acquire the supplementary sensor data.

In Example AA7, the subject matter of Example AA1 can optionally include where the user device is a cellular phone or smartphone.

In Example AA8, the subject matter of any of Examples AA1-AA2 can optionally include where the library of object recognition profiles for the supplementary sensor are stored in a network element and communicated to the autonomous vehicle after the user device that includes the supplementary sensor is identified.

In Example AA9, the subject matter of any of Examples AA1-AA3 can optionally include where the identified objects and/or features in the environment were not detected by the sensors on the autonomous vehicle.

In Example AA10, the subject matter of any of Examples AA1-AA4 can optionally include one or more instructions that, when executed by at least one processor, causes the at least one processor to communicate a request to the user for the user to position the user device in a specific location to allow the supplementary sensor on the user device to acquire the supplementary sensor data.

In Example AA11, the subject matter of any of Examples AA1-AA5 can optionally include one or more instructions that, when executed by at least one processor, causes the at least one processor to communicate a request to the user for the user to place the user device in a user device holder in the autonomous vehicle to allow the supplementary sensor on the user device to acquire the supplementary sensor data.

In Example AA12, the subject matter of any of Examples AA1-AA6 can optionally include where the user device is a cellular phone or smartphone.

What is claimed is:

1. A method for supplementing a vehicle's sensors with a personal sensor on a user device, the method comprising:
   identifying the personal sensor on the user device;
   communicating a library of object recognition profiles for the personal sensor to the user device;
   selecting one of a plurality of user device holders in the vehicle into which the user device is to be placed;
   illuminating a light on the one of the plurality of user device holders to indicate to a user to place the user device into the one of the plurality of user device holders;
   subsequent to the user device being placed into the one of the plurality of user device holders, capturing personal sensor data related to an environment;
   using the library of object recognition profiles for the personal sensor to use the captured personal sensor data to identify objects and/or features in the environment; and
   using the identified objects and/or features in the environment to supplement data collected by the vehicle's sensors.

2. The method of claim 1, wherein identifying objects and/or features in the environment includes:
   determining a location or orientation of the user device; and
   using the location or orientation of the user device to supplement data collected by the vehicle's sensors.

3. The method of claim 2, wherein supplementing the data collected by the vehicle's sensors includes translating and rotating spatial data from the personal sensor based on the determined location and orientation of the user device.

4. The method of claim 1, wherein the library of object recognition profiles for the personal sensor are stored on the user device and are used by the user device to identify the objects and/or features in the environment based on the captured personal sensor data.

5. The method of claim 1, wherein the library of object recognition profiles is created by:
   identifying the personal sensor on the user device;
   training a personal perception module to identify the objects and/or features in the environment based on data captured by the personal sensor; and
   using the training from the personal perception module to create the library of object recognition profiles for the personal sensor.

6. The method of claim 1, wherein the library of object recognition profiles are an executable set of machine instructions.

7. The method of claim 6, wherein the executable set of machine instructions are in binary code.

8. The method of claim 1, wherein the library of object recognition profiles for the personal sensor are stored in a network element.

9. The method of claim 8, the library of object recognition profiles for the personal sensor are communicated to the vehicle after the user device that includes the personal sensor is identified.

10. The method of claim 1, wherein the identified objects and/or features in the environment were not detected by the sensors on the vehicle.

11. The method of claim 1, wherein the personal sensor is a camera or light detection and ranging (LIDAR) sensor.

12. The method of claim 1, wherein a user of the user device is requested to position the user device in a certain position to allow the personal sensor on the user device to acquire the personal sensor data.

13. The method of claim 1, wherein the user device is a cellular phone or smartphone.

14. A vehicle for supplementing vehicle sensor data with supplemental sensor data from one or more sensors on a user device, the vehicle comprising:
   a sensor suite including external vehicle sensors to sense an environment and generate sensor data;
   a perception module to receive the sensor data and to acquire map data and to use the map data and the sensor data to generate vehicle real world environment data;
   a user device interface module to communicate with the user device;
   a user device resource usage module to use supplemental sensor data from one or more sensors on the user device to supplement the sensor data; and
   a plurality of user device holders, wherein one of the plurality of user device holders is selected for receiving the user device,
   wherein a light on the one of the plurality of user device holders is illuminated to indicate to a user to place the user device into the one of the plurality of user device holders, and
   wherein the supplemental sensor data is collected subsequent to the user device being placed into the one of the plurality of user device holders.

15. The vehicle of claim 14, wherein the vehicle communicates a message to a user of the user device to position the user device in a specific area.

16. The vehicle of claim 14,
   wherein the one of the plurality of user device holders fixes a position of the one or more sensors on the user device in a specific location.

17. At least one non-transitory machine-readable medium comprising one or more instructions that, when executed by at least one processor, causes the at least one processor to:
   determine that sensor data from an autonomous vehicle's sensors needs to be supplemented with supplementary sensor data;
   identify a supplementary sensor on a user device, wherein the supplementary sensor can provide the supplementary sensor data;
   selecting one of a plurality of user device holders in the vehicle into which the user device is to be placed;
   generating a sound from the one of the plurality of user device holders to indicate to a user to place the user device into the one of the plurality of user device holders;
   if a user of the user device allows the supplementary sensor to be accessed, communicate a library of object recognition profiles for the supplementary sensor to the user device;
   capture supplementary sensor data related to an environment in a vicinity of the user device;

use the library of object recognition profiles for the supplementary sensor to use the captured supplementary sensor data to identify objects and/or features in the environment in the vicinity of the user device; and use the identified objects and/or features in the environment to supplement data collected by the autonomous vehicle's sensors.

18. The least one machine-readable medium of claim 17, wherein the library of object recognition profiles for the supplementary sensor are stored in a network element and communicated to the autonomous vehicle after the user device that includes the supplementary sensor is identified.

19. The least one machine-readable medium of claim 17, wherein the identified objects and/or features in the environment were not detected by the sensors on the autonomous vehicle.

* * * * *